United States Patent
Torii et al.

(10) Patent No.: US 9,724,847 B2
(45) Date of Patent: Aug. 8, 2017

(54) THERMAL INSULATED MOLD AND PRODUCTION METHOD THEREOF

(71) Applicant: KOBE CERAMICS CORPORATION, Suita-shi (JP)

(72) Inventors: Hideo Torii, Suita (JP); Takayoshi Suzuki, Suita (JP)

(73) Assignee: KOBE CERAMICS CORPORATION, Suita-shi, Osaka (JP)

( * ) Notice: Subject to any disclaimer, the term of this patent is extended or adjusted under 35 U.S.C. 154(b) by 164 days.

(21) Appl. No.: 14/281,552

(22) Filed: May 19, 2014

(65) Prior Publication Data
US 2015/0102202 A1 Apr. 16, 2015

(30) Foreign Application Priority Data
Jun. 5, 2013 (JP) .................................. 2013-118681

(51) Int. Cl.
*B29C 33/38* (2006.01)
*B29C 33/56* (2006.01)
*B29C 33/02* (2006.01)

(52) U.S. Cl.
CPC .......... *B29C 33/3828* (2013.01); *B29C 33/56* (2013.01); *B29C 2033/023* (2013.01); *B29K 2905/08* (2013.01)

(58) Field of Classification Search
CPC ................ B29C 33/3828; B29C 33/56; B29C 2033/023; B29C 33/3842; B29K 2905/08
USPC .............................................. 249/114.1, 116
See application file for complete search history.

(56) References Cited

U.S. PATENT DOCUMENTS

| | | | | |
|---|---|---|---|---|
| 4,262,875 A * | 4/1981 | Nyman | ................... | B29C 33/56 204/192.15 |
| 4,721,518 A * | 1/1988 | Monji | ................... | C03B 11/086 249/116 |
| 4,842,633 A * | 6/1989 | Kuribayashi | ........... | B22F 5/007 216/24 |
| 4,889,548 A * | 12/1989 | Kriegesmann | ............ | C03B 9/48 106/38.9 |
| 5,171,348 A * | 12/1992 | Umetani | ............... | B32B 15/018 65/26 |
| 6,119,485 A * | 9/2000 | Hibino | .................. | C03B 11/086 249/116 |
| 2002/0153636 A1* | 10/2002 | Mastro | .................... | B29C 33/56 264/219 |
| 2002/0170695 A1* | 11/2002 | Sato | ........................ | B29C 33/56 164/6 |
| 2003/0222376 A1* | 12/2003 | Imatomi | ................. | B22F 3/105 264/219 |
| 2004/0253334 A1* | 12/2004 | Bandoh | ................... | B29C 33/10 425/117 |

(Continued)

*Primary Examiner* — Alison L Hindenlang
*Assistant Examiner* — Emmanuel S Luk
(74) *Attorney, Agent, or Firm* — Fox Rothschild LLP

(57) ABSTRACT

The present invention provides a heat insulated mold having a zirconia insulated layer, the deterioration of which is effectively limited or prevented.
The present invention relates to a heat insulated mold having a heat insulating layer between a metal mold base material and a metal film forming a molding surface, wherein: (1) the insulating layer contains zirconia; and (2) a water-blocking layer for blocking entrance of water from the metal film to the heat insulating layer is provided between the heat insulating layer and the metal film.

17 Claims, 11 Drawing Sheets

(56) References Cited

U.S. PATENT DOCUMENTS

| | | | | |
|---|---|---|---|---|
| 2005/0285287 A1* | 12/2005 | Okumura | ................ | B29C 33/02 |
| | | | | 264/2.5 |
| 2006/0051453 A1* | 3/2006 | Imatomi | ................. | B29C 33/56 |
| | | | | 425/589 |
| 2011/0084424 A1* | 4/2011 | Kaida | ................... | B29C 33/424 |
| | | | | 264/293 |
| 2012/0094145 A1* | 4/2012 | Chang | ................... | C04B 37/026 |
| | | | | 428/632 |
| 2013/0127090 A1* | 5/2013 | Yamada | ................. | B29C 33/40 |
| | | | | 264/293 |
| 2013/0186467 A1* | 7/2013 | Saeki | ................... | B29C 33/424 |
| | | | | 136/259 |

* cited by examiner

THERMAL INSULATED MOLD AND PRODUCTION METHOD THEREOF

BACKGROUND OF THE INVENTION

1. Field of the Invention

The present invention relates to a thermal insulated mold used for resin molding of optical elements, precision components and the like, and to a method for producing the thermal insulated mold.

2. Description of the Related Art

In up-to-date injection resin molding which uses molds for molding resins having fine pattern shapes, thermal insulated molds are useful in order to allow flow of molten resin into fine machined grooves deeply formed on the molds to transfer the shapes of the grooves. With ordinary molds, the heat of the molten resin having an increased temperature to be molded on surfaces of metal molds escapes through metal substrates, resulting in defects in resin molding due to unnecessary reduction in temperature of the resin during molding. However, thermal insulated molds can effectively prevent such molding defects.

Thermal insulated molds have thermal insulating layers having low thermal conductivity and high strength between a mold base material made of metal and a film that forms a transfer surface of resin. For the thermal insulating layers, ceramic materials may be used because of the insulating effect thereof and the strength that is resistant against high molding pressure during resin molding such as injection molding. Among others, thermal insulating layers (hereinafter referred to as zirconia thermal insulating layers) containing plate-shaped members of zirconium oxide (hereinafter referred to as zirconia) sintered body or containing, as a main component, crystal zirconia such as zirconia sprayed films have been employed (see, for example, Japanese Patent Application Publication No. 2004-175112).

In order to meet the requirements for thermal insulated molds for resin molding to allow transfer of complicated and fine configurations, a metal film of a dense amorphous nickel-phosphorous alloy having sufficient machinability is usually formed on a zirconia thermal insulating layer at the upper molding side by electroless plating, which surface layer is then subjected to precision machining.

In case of molding resins, a molten resin generally flows on the surface of a metal film, and thus the metal film has a surface temperature that is the temperature of the molten resin. However in the thermal insulated mold thus manufactured which contains the thermal insulating layer having low thermal conductivity immediately below the metal film, the heat of the molten resin is less transferred to the mold base material made of metal lying below the thermal insulating layer, and thus reduction in temperature of the molten resin is limited. As a result, the molten resin having high temperature can flow into microfabrication patterns such as deep grooves provided on the surface of the mold while maintaining low viscosity, allowing accurate transfer of the pattern configurations.

Metal films as the molding surface of heat insulating molds are generally formed of plated metal films. For example, a mold for optical element molding has been known that is obtained by forming a metal film formed of an electroless nickel-phosphorous alloy plated film which allows facilitated formation of fine patterns by machining on the molding side of a thermal insulating layer and providing microfabrication of transfer patterns by machining on the surface of the metal film (see Japanese Patent No. 4135304).

However, with the above configurations, repetitive heating and cooling during molding of optical elements may cause thermal stress at the border of the thermal insulating layer ($ZrO_2$: coefficient of thermal expansion: 10 to 11×$10^{-6}$/°C., coefficient of thermal conductivity: 1 to 1.5 W/mK) and the surface electroless nickel-phosphorous alloy plated film (coefficient of thermal expansion: 11 to 12×$10^{-6}$/°C., coefficient of thermal conductivity: 4.0 to 7.2 W/mK) due to the difference in the coefficient of thermal expansion therebetween, resulting in film detachment.

In order to prevent the detachment, a thermal insulated mold containing an intermediate layer which has the coefficient of thermal expansion similar to both layers, is compatible with both layers in material point of view and has excellent adhesiveness has been proposed. For example, the intermediate layer has been used which is manufactured by high-speed flame spraying of a NiAl alloy having the coefficient of thermal expansion of 13×$10^{-6}$/K and the coefficient of thermal conductivity of 20 W/mK. Alternatively use of a sprayed film of cermet which is a composite sintered body of metal and ceramic as the intermediate layer or use of a material having the composition that varies along the thickness direction of the film, which has been derived as a result of focusing on the compositions of a thermal insulating layer and a surface processing layer, has been proposed (see, for example, WO 2007/020769).

Also, in order to prevent film detachment in a mold containing a thermal insulating layer formed of a zirconia sintered body due to the thermal stress at the border of two layers resulting from the difference in the coefficient of thermal expansion native to the materials generated during repetitive heating and cooling upon molding, a thermal insulated mold has been known which comprises a porous zirconia sintered body, at a centre of a thermal insulating layer, prepared by sintering zirconia particles; a porous sintered body stacked on the porous zirconia sintered body, that contains mixed particles of nickel metal particles and zirconia particles such that the content of nickel metal particles is inclined so as to be higher at the upper portion of the porous sintered body; a nickel metal sheet material bonded on the porous sintered body with a solver solder; and a nickel-phosphorous plated film layer on the nickel metal sheet material, wherein a porous sintered body is stacked below the porous zirconia sintered body, that contains metal particles having the same compositions as a mold base material (stainless steel) instead of nickel metal particles such that the composition is inclined along the thickness direction of the film (see, for example, Patent Document 4; Japanese Patent Application Publication No. 2010-194805).

PRIOR ART

Patent Document

Patent document 1: Japanese Patent Application Publication No. 2004-175112
Patent document 2: Japanese Patent No. 4135304
Patent document 3: WO 2007/020769
Patent document 4: Japanese Patent Application Publication No. 2010-194805

SUMMARY OF THE INVENTION

However, when the heat insulated mold containing the zirconia thermal insulating layer is used for injection molding, in spite of the initial sufficient strength, the strength of the mold is decreased over time, which means the problem of short life time of the product. More specifically, the thermal insulating layer has the strength decreasing over time and ultimately is disintegrated and detached.

As a result of pursuit of the cause of the above problems, the present inventors have ascertained that the cause of deterioration of the thermal insulated mold lies in the relation between crystal zirconia which is a material of the insulating film and the metal film formed thereon. Namely, the present inventors have learned that a trace amount of water in the metal film affects zirconia over time to deteriorate the thermal insulating layer, leading to a short life time of the heat insulated mold.

Water may exist between a zirconia thermal insulating layer and a metal film or in a zirconia thermal insulating layer. Particularly in a zirconia sprayed film having a relatively high number of pores is more significantly deteriorated because the pores may easily hold water.

In general, thermal spraying method is a method in which metal or ceramic particles are heated to a molten or semi-molten state and sprayed at high speed through a nozzle to cause collision and deposition of the particles on a material, thereby forming a coating. The sprayed particles of liquid of a starting material molten at high temperature are usually cooled while the particles are flying towards a substrate to be coated, collide against the substrate and simultaneously are flattened. The coating obtained by thermal spraying under normal conditions which is formed by continuous deposition of the flattened particles is observed to have a laminated lamellar structure which is characteristic of sprayed films. The laminated lamellae contain unjoined parts therebetween and there are many open pores. Ceramic coatings thus further significantly contain lamellar structures or open pores (see, for example, Masahiro FUKUMOTO, "Yosha (Spraying)", Journal of the Japan Welding Society, vol. 66 (1999), No. 8, p. 617-633).

When the base layer for deposition of sprayed particles has an extremely high temperature, melt-adhesion between laminated lamellae can be facilitated, resulting in formation of films with the open pores being closed. Meanwhile, a sprayed film is formed at a relatively low temperature in order to avoid the reduction in processing accuracy resulting from annealing at an extremely high temperature of a mold base material made of steel or stainless steel after precision processing because the mold base material, when it serves as a core of the mold for example, has been precisely machined by taking a clearance in a cavity space into account. This results in sprayed films having lamellar structures containing many open pores. Whatever the case, with regard to the sprayed films used for conventional thermal insulated molds, not only zirconia thermal insulating layers but also adhesion layers formed thereon such as metal sprayed films or cermet sprayed films contain many open pores.

Meanwhile, on the upper surface of the zirconia thermal insulating layer, a processing film of a nickel-phosphorous alloy is formed by plating. The general procedure of plating is as a) to d) herein below:

a) A material to be plated is first subjected to alkaline degreasing with a NaOH aqueous solution and the like and washing with water.

b) The surface is then etched with a hydrochloric acid aqueous solution and thoroughly washed by ultrasonic cleaning.

c) The material is subjected to sensitizing with a hydrochloric acid acidic aqueous solution of tin chloride and activating with a hydrochloric acid acidic aqueous solution of palladium chloride, so that the surface zirconia carries palladium catalytic particles.

d) The material is then subjected to a plating process, in which the material is immersed in an electroless nickel-phosphorous plating bath to form a plated film.

The above pretreatment with a) to c) allows palladium catalytic particles carried on the zirconia sprayed film to serve as initiation points of growth, resulting in formation of the electroless nickel-phosphorous plated film (see, for example, Muneaki SUZUKI, "Gokin mekki gijyutsu no kenkyu (Study on alloy plating technology)", Reports of the Ibaraki Prefectural Industrial Technology Centre, vol. 15 (1986)).

Thus when a plated film is formed on a zirconia thermal insulating layer, a small amount of water from the plated film formation step may remain in a sealed space between the zirconia thermal insulating layer and the nickel-phosphorous alloy plated film, and may particularly be entrapped within pores in the lamellar structure in case of the zirconia sprayed film.

Pure zirconia ($ZrO_2$) is a metal oxide having three different crystal structures depending on temperature, in nature. Generally, the crystal structure thereof reversibly changes with an increase in temperature from monoclinic to tetragonal at 1100° C. and from tetragonal to cubic at 2300° C. During temperature decrease from an extremely high temperature range to room temperature, the phase transition from the cubic crystal stable in an extremely high temperature range to the tetragonal crystal stable in a high temperature range is accompanied by a volume shrinkage of as high as about 8% and the phase transition from the tetragonal crystal stable in a high temperature range to the monoclinic crystal stable in a low temperature range is accompanied by a volume shrinkage of as high as about 4%. Due to this, the mechanical strength thereof is significantly decreased. Thus, it is difficult to use pure zirconia for normal applications. Thus in general a so-called stabilizing agent such as yttrium oxide ($Y_2O_3$) and calcium oxide (CaO) is solid-dissolved in pure zirconia in order to maintain and stabilize at low temperatures or room temperature for normal applications of the tetragonal or cubic crystal that is a crystal structure at a high temperature range during preparation of zirconia ceramics and to prevent the phase transition to the monoclinic crystal with temperature decrease. Stabilized zirconia (cubic crystal) which contains the stabilizing agent at such an amount that the phase transition is completely prevented and partially stabilized zirconia that contains a lower amount of the stabilizing agent and is formed from a mixed phase of tetragonal and cubic crystals may be mentioned. For applications that require high mechanical strength, partially stabilized zirconia materials which are zirconia ceramics having increased strength and containing an increased amount of tetragonal crystals are used. Zirconia sintered bodies and zirconia sprayed films used for thermal insulated molds also usually contain a stabilizing agent so as to have the crystal phase of partially stabilized zirconia in order to be resistant to high pressure during resin molding.

However, partially stabilized zirconia sintered bodies may have, although the tetragonal zirconia crystal portion in the sintered body has stabilized structure due to the stabilizing agent, a crystal phase that undergoes phase transition from the tetragonal crystal to the monoclinic crystal involving significant volume expansion and thus gradual deterioration in strength when the sintered body and thus the crystal phase is exposed for a prolonged period of time to an atmosphere containing water at a temperature (e.g., a temperature of 80 to 300° C.) relatively low for ceramics.

In this phenomenon, when zirconium oxide ($ZrO_2$) constituting zirconia ceramics is exposed to water vapour at the above high temperature range and undergoes chemical reaction with water ($H_2O$), the Zr—O—Zr bond in the crystal structure is cleaved and the cleaved site is chemically converted to zirconium hydroxide. This may lead promotion of phase transition of crystal particles of zirconium oxide from the tetragonal crystal to the monoclinic crystal. Due to this phase transition, the portion which underwent the phase transition in the whole zirconia ceramic causes significant volume expansion, resulting in production of many microcracks in the zirconia ceramic. Moreover water enters the microcracks, the phase transition further develops on the inner surface of the microcracks, the volume expansion cause the production of further microcracks, resulting in disruption of the zirconia ceramic per se.

Namely, the deterioration phenomenon at low temperatures in the atmosphere containing water is preceded by phase transition from the tetragonal crystal to the monoclinic crystal at the temperatures. The phase transition is gradually expanded and causes production of many microcracks in the whole zirconia ceramic and ultimately disruption of the zirconia ceramic per se (see, for example, Ryoichi YOMO, Taiji YAMAMOTO and Yuzo NISHIKAWA, "Journal of the Society of Materials Science, Japan", vol. 39, No. 441, p. 171-175).

In a thermal insulated mold containing such a zirconia thermal insulating layer, the zirconia surface which is in contact with water (including water entrapped in pores in case of a sprayed film) entrapped in fine spaces between the zirconia thermal insulating layer and a metal film formed of a plated film is exposed to drastic temperature change and pressure change during resin molding with high compression stress involving cycles of heating to high temperature at the surface layer of the mold so as to allow flow of a molten resin injected at a high temperature and high pressure (generally in the range of 100° C. to 250° C.) and cooling and reduction of pressure to normal pressure in order to draw the molded resin article having the pattern transferred thereon, as well as after the resin molding in which the heating of the mold is halted, so that the mold is cooled to room temperature. During the above temperature and pressure changes, it is believed that the reaction of zirconia and water (water vapour) develops, the microcracks generated inside are gradually expanded and the zirconia material is deteriorated and disrupted, resulting in a short life time of the thermal insulated mold. Namely when injection molding is carried out under this situation, the pressure of injection molding may promote expansion of the cracks. As a result the zirconia thermal insulating layer is collapsed, leaving depressions.

Thus a main object of the present invention is to provide a thermal insulated mold having a zirconia thermal insulating layer in which the zirconia thermal insulating layer is effectively suppressed or prevented from deteriorating.

The present inventors have carried out exhaustive studies with the foregoing problems in view and as a result have found that the above object can be achieved by a thermal insulated mold having a specific structure, thereby completing the present invention.

Namely, the present invention pertains to the following thermal insulated mold and the production method thereof.

1. A thermal insulated mold having a thermal insulating layer between a metal mold base material and a metal film forming a molding surface, wherein:
   (1) the thermal insulating layer contains zirconia; and
   (2) a water-blocking layer is provided between the thermal insulating layer and the metal film.

2. The thermal insulated mold according to the item 1, wherein the water-blocking layer is formed of an elemental metal or an alloy.

3. The thermal insulated mold according to the item 2, wherein the water-blocking layer is formed of at least one selected from copper, iron, titanium, tantalum, chromium, molybdenum and tungsten and alloys containing thereof.

4. The thermal insulated mold according to any of the items 1 to 3, wherein the water-blocking layer includes a plurality of layers respectively having different compositions.

5. The thermal insulated mold according to the item 4, wherein the water-blocking layer includes a first water-blocking layer formed on the thermal insulating layer so as to be in contact with the thermal insulating layer and a second water-blocking layer formed on the first water-blocking layer so as to be in contact with the first water-blocking layer.

6. The thermal insulated mold according to the item 5, wherein the first water-blocking layer is formed of at least one selected from titanium, tantalum, chromium, molybdenum, tungsten and iron and alloys containing thereof.

7. The thermal insulated mold according to the item 5 or 6, wherein the second water-blocking layer is formed of at least one selected from copper, iron and alloys containing thereof.

8. The thermal insulated mold according to any of the items 5 to 7, wherein the first water-blocking layer has a thickness of 0.02 to 0.8 µm.

9. The thermal insulated mold according to any of the items 5 to 8, wherein the second water-blocking layer has a thickness of 1 to 20 µm.

10. The thermal insulated mold according to any of the items 5 to 9, wherein the water-blocking layer is formed by physical vapour deposition.

11. The thermal insulated mold according to any of the items 5 to 10, wherein the water-blocking layer is formed so as to surround an upper surface and a side surface of the thermal insulating layer.

12. The thermal insulated mold according to any of the items 5 to 11, wherein the thermal insulating layer includes a zirconia sintered body.

13. The thermal insulated mold according to any of the items 5 to 11, wherein the thermal insulating layer is formed by thermal spraying.

14. The thermal insulated mold according to any of the items 1 to 13, which is used for molding of a composition containing a resin component.

15. A method for producing the thermal insulated mold according to the item 1, including the steps of:
   (1) forming a thermal insulating layer containing zirconia on surface on a molding surface side of a metal mold base material;
   (2) forming a water-blocking layer on a surface of the thermal insulating layer by physical vapour deposition;
   (3) forming a metal film on a surface of the water-blocking layer by plating; and
   (4) implementing machining a surface of the metal film to form a transfer configuration surface for resin molding.

16. The method according to the item 15, wherein the step (1) includes the steps of:
   (1-1) arranging a bonding layer the surface on the molding surface side of the metal mold base material;
   (1-2) arranging a zirconia sintered body on the bonding layer; and (1-3) applying pressure on the zirconia sintered body while heating to forma thermal insulating layer via the bonding layer.

17. The method according to the item 15, wherein the step (1) includes the steps of:
(1-1) forming a bonding layer on the surface on the molding surface side of the metal mold base material by thermal spraying; and
(1-2) forming the thermal insulating layer containing zirconia on the bonding layer by thermal spraying.

Advantages of the Invention

According to the present invention, a thermal insulated mold including a zirconia thermal insulating layer can be provided in which the deteriorating of the zirconia thermal insulating layer is effectively limited or prevented. More specifically, the thermal insulated mold of the present invention having a specific structure which includes a water-blocking layer has decreased depressions on the surface of the mold due to deterioration over time of the strength of the zirconia thermal insulating layer, resulting in an extended life time of the thermal insulated mold, compared to a conventional thermal insulated mold of the same type having the thermal insulating layer such as a zirconia sintered body or a zirconia thermal-sprayed film.

Particularly when for example the metal film which constitutes the molding surface is formed by plating that is a wet process, the zirconia thermal insulating layer is completely isolated by means of the water-blocking layer, so that entrance of water to the zirconia thermal insulating layer can be effectively restricted or prevented. Thereby water adsorption at the surface of crystal zirconia in the zirconia thermal insulating layer can be prevented that otherwise may trigger deterioration at low temperatures. As a result, one mold can be repeatedly used for resin molding for a significantly increased number of times, resulting in reduction in running costs because of an improved life time of the thermal insulated mold.

Particularly when the water-blocking layer is formed by physical vapour deposition (particularly by sputtering), water existing at the irregular surface or in open pores of the primer layer or the zirconia thermal insulating layer is completely eliminated during vacuuming and exhaustion in a sputtering device during the preparation step for sputtering film formation and the primer layer or the zirconia thermal insulating layer is thoroughly dried, thereby deterioration of the zirconia thermal insulating layer can be effectively suppressed.

When the water-blocking layer includes a first water-blocking layer which is a metal film liable to be oxidized to forma rigid oxide coating thereon and a second water-blocking layer which is formed with a conductive metal film, further improved water-blocking effect can be exhibited because particularly the second water-blocking layer is a metal film which maintains compression stress characteristic to thin films prepared by sputtering, and thus can provide a film which is thin but is dense.

Moreover, by forming a first water-blocking layer which is a metal film (e.g., titanium (Ti)) liable to be oxidized to form a rigid oxide film between the oxide ceramic or zirconia and the water-blocking layer, the bond between a zirconium atom and an oxygen atom (Zr—O) on the surface of the zirconium thermal insulating layer for example is attached to a metal atom (e.g., Ti) in the first water-blocking layer to form a Zr—O—Ti bond, and thus the first water-blocking layer can be rigidly bonded to the zirconia thermal insulating layer surface. Meanwhile the first water-blocking layer and the second water-blocking layer thereon formed of a conductive metal film may have rigid bonding between metals when the layers are formed by sputtering.

In addition, when the second water-blocking layer above the thermal insulating layer is a conductive metal film, nickel strike plating, one of electrolytic plating methods, is feasible, resulting in the formation of a rigid nickel primer layer of an electroless plated film. An amorphous nickel-phosphorous alloy electroless plated film which is compatible can be subsequently formed on the nickel primer layer, and thus the metal film which serves as a precision processing surface can be rigidly bonded to the water-blocking layer.

As described above, by forming the water-blocking layer including two layers by sputtering, high adhesiveness from the zirconia thermal insulating layer to the metal film can be secured and the tolerance against temperature cycles during resin molding procedures can also be secured. As a result, the reliability of the thermal insulated mold during long-term molding procedures can be further improved.

The thermal insulated mold of the present invention having the above properties is suitable for manufacturing of particularly resin molded articles having fine pattern shapes. Accordingly, the thermal insulated mold of the present invention is useful for manufacturing of, for example, optical components (lenses, prism sheets, light guide plates, optical discs such as CD and DVD discs).

Figure 1:
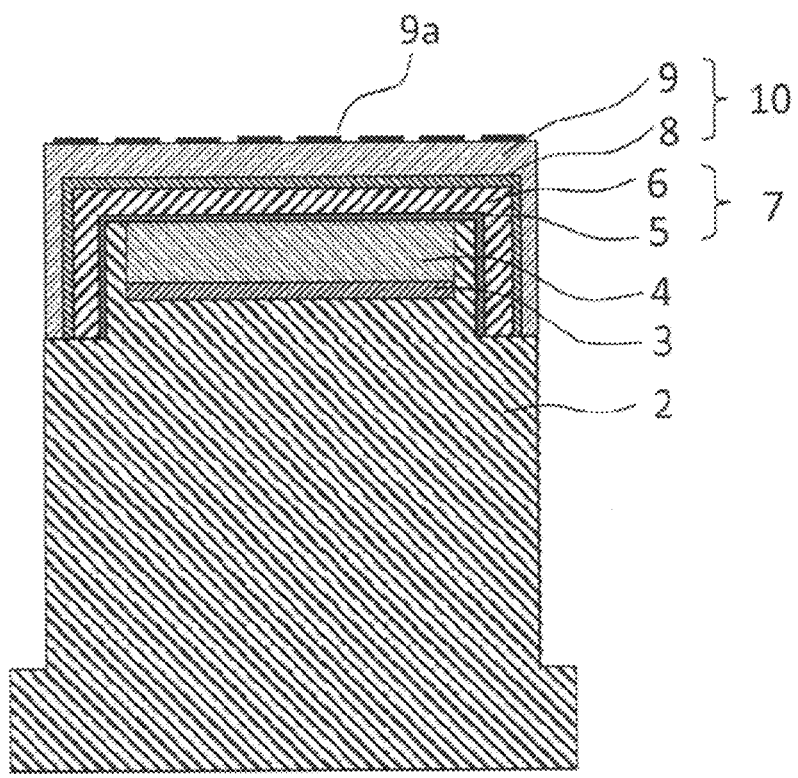
FIG. 1 is a schematic section view of the thermal insulated mold of Example 1 of the present invention.

EXPLANATION OF REFERENCES 1, 31 thermal insulated mold
2, 32 metal mold base material
2a central region
2b peripheral region
2c side wall part
3, 13, 33, 43 bonding layer
4, 34, 44 thermal insulating layer
5, 15, 35, 45 first water-blocking layer
6, 16, 36, 46 second water-blocking layer
7, 17, 37, 47 water-blocking layer
8, 18, 38, 48 first metal film
9, 19, 39, 49 second metal film
9a, 39a precision processed surface
10, 20, 40, 50 metal film
11a, 21a, 41a, 51a first sample
11b, 21b, 41b, 51b first comparative sample
12 base substrate parts
14 heat insulating substrate
22 rectangular cylinder component
23 measurement stage
24 support post
25 pulley
26 wire rope
27 weight
44 metal substrate
101 fixed mold
102 movable mold
103 resin

DESCRIPTION OF THE PREFERRED EMBODIMENTS

1. Thermal Insulated Mold

The thermal insulated mold of the present invention (present thermal insulated mold) is a thermal insulated mold having a thermal insulating layer between a metal mold base material and a metal film having a surface for molding, wherein:

(1) the thermal insulating layer comprises zirconia; and
(2) a water-blocking layer is provided between the thermal insulating layer and the metal film.

As described above, the present insulated mold has the fundamental structure of the metal mold base material/thermal insulating layer/water-blocking layer/metal film and may include another layer, if necessary. Unless otherwise stated, the term "metal" as used herein is intended to include elemental metals as well as alloys and intermetallic compounds.

Figure 11:
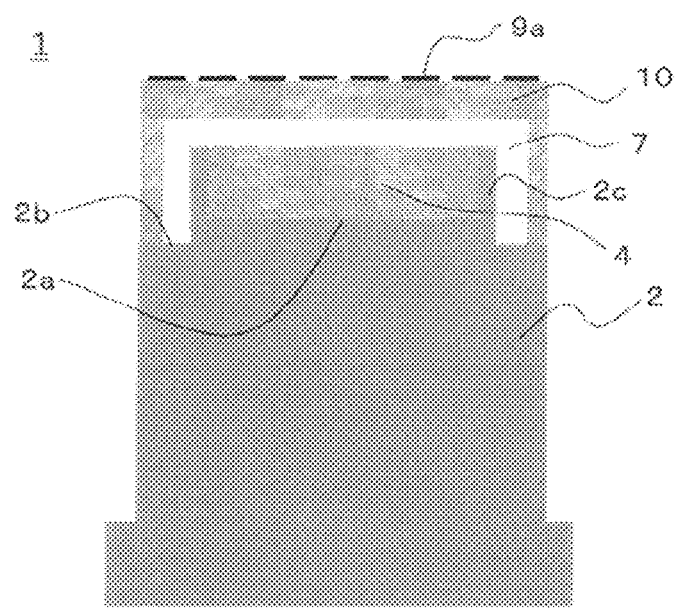
FIG. 11 is a schematic view showing an exemplary configuration of the mold of the present invention.

FIG. 11 shows a schematic view of an exemplary configuration of the present insulated mold. A thermal insulating layer 4 is formed at the central region 2a excluding the peripheral region 2b on the upper surface on the side of the molding surface of the mold base material 2 made of metal. In FIG. 11, the central region 2a is formed at a higher altitude than the peripheral region 2b. However, the central region 2a may be at the same altitude as the peripheral region 2b. In this case, a side wall part 2c may be formed around the central region 2a, as shown in FIG. 11, so as to accommodate the thermal insulating layer 4 in the interior space (depressed part) thereof. The formation of the side wall part 2c may prevent the thermal insulating layer 4 from being exposed to external air, resulting in a further improvement in the insulating effect (heat retention effect). Although the side wall part 2c is formed in the embodiment shown in FIG. 11, the side wall part may or may not be formed in the present insulated mold. Although the peripheral region 2b is formed in the embodiment shown in FIG. 11, the peripheral region may or may not be formed in the present insulated mold.

A water-blocking layer 7 is formed on the thermal insulating layer 4. As shown in FIG. 11, the water-blocking layer 7 is preferably formed so as to surround the upper surface and the side surface of the thermal insulating layer 4 in order to further improve the water-blocking effect by the water-blocking layer. In FIG. 11, the side wall part 2c exists between the side surface of the thermal insulating layer 4 and the water-blocking layer 7 so as to be in contact with both layers. When the side wall part 2c is not formed, the water-blocking layer 7 is arranged so as to be in contact with the side surface of the thermal insulating layer 4. As shown in FIG. 11, it is also preferable that both ends of the water-blocking layer 7 are extended to the positions that are below the lower surface of the thermal insulating layer 4 in order to further improve the water-blocking effect.

A metal film 10 is formed on the water-blocking layer 7. In FIG. 11, the metal film 10 is also formed so as to surround the upper surface and the side surface of the thermal insulating layer 4 in the same manner as the water-blocking layer 7. However, the metal film 10 may alternatively be formed only above the upper surface of the thermal insulating layer 4, if necessary. The upper surface (molding surface) of the metal film 10 has a precision processed surface 9a formed thereon having specific irregular configurations.

The layers of the fundamental structure of the present insulated mold, i.e., the metal mold base material, the thermal insulating layer, the water-blocking layer and the metal film are described hereinbelow.

Metal Mold Base Material

The metal mold base material may be the one formed of metal which may be the same material as those used for well-known or commercially available molds. For example, the metal may include metals (elemental metals) such as iron, aluminium and copper, alloys such as carbon steel, stainless steel, copper alloys and titanium alloys, and the like. The metal mold base material may be either of an ingot material and a sintered body. The metal mold base material in the present invention is particularly preferably formed of an iron-based metal because of high hardness and preferable processability thereof. Namely, the metal mold base material is preferably formed of at least one iron-based metal selected from metal iron and iron alloys. The iron alloy may suitably be, but is not limited to, carbon steel, stainless steel (SUS), chromium molybdenum steel and the like.

The metal mold base material may have any configuration among flat and curved surfaces on the molding surface side thereof, may have a reversed configuration of the fine configuration to be imparted to the final molded article, and may be configured appropriately according to the configuration of the desired molded article. For example, when the mold is required to have a particularly deep depressed part (groove), the metal mold base material may have on the molding surface side thereof a reversed configuration of the configuration to be transferred or a similar configuration thereto (depressed part).

Water-Blocking Layer

The water-blocking layer in the present invention is to particularly prevent water from entering or contacting the thermal insulating layer (particularly entrance or contact of water from the metal film into the thermal insulating layer), and thus the material and the like of the water-blocking layer is not particularly limited as far as the water-blocking layer can provide the function. The water-blocking layer in the present invention is preferably formed of a single metal or an alloy because the formation thereof is easy by physical vapour deposition (particularly by sputtering) and formation of the metal film thereon is also easy. More specifically, the water-blocking layer is preferably formed of at least one selected from copper, iron, titanium, tantalum, chromium, molybdenum and tungsten and alloys containing thereof.

The water-blocking layer preferably has a thickness of, but is not limited to, generally 1 to 50 μm and particularly 1 to 30 μm. The water-blocking layer having the thickness within this range can provide further excellent water-shielding function.

In the present invention, the water-blocking layer may contain a single layer or a plurality of layers respectively having distinct compositions. Specifically, the water-blocking layer as a single layer may be directly formed on the thermal insulating layer. The water-blocking layer as a two layer structure containing a first water-blocking layer and a second water-blocking layer may be formed so that the first water-blocking layer exists between the thermal insulating layer and the second water-blocking layer as a bonding film (primer layer). The water-blocking layer is desirably formed so that the water-blocking layer is in contact with both the zirconia thermal insulating layer formed on the metal mold base material and the metal film. For example, as shown in FIG. 1, the structure of a water-blocking layer 7 containing a first water-blocking layer 5 formed on the thermal insulating layer 4 so as to be in contact with the thermal insulating layer 4 and a second water-blocking layer 6 formed on the first water-blocking layer 5 so as to be in contact with the first water-blocking layer 5 can be suitably employed.

When the water-blocking layer has the above double layer structure, the compositions and configurations of the respective water-blocking layers can be appropriately selected according to the desired water-blocking properties and the like.

The composition of the second water-blocking layer is not particularly limited as far as it is formed of an electric conductive metal, and can be formed of a conductive metal material that allows formation of a dense film by sputtering and allows formation of a rigid metal plated film by electrolytic plating. In the present invention, the second water-blocking layer is preferably formed of at least one selected from copper, iron and alloys containing thereof. The second water-blocking layer of the conductive metal film may have a thickness appropriately selected according to the type of the metal element forming thereof, the thickness and the surface irregularity of the thermal insulating layer and the like and may generally have a thickness within 2 to 20 μm. The second water-blocking layer having the thickness within the range can provide a more effective water-blocking effect.

The first water-blocking layer is formed preferably of a metal that is liable to be oxidized to form a rigid oxide film on the surface in order to serve as a bonding film particularly to the base layer (e.g., a base layer including the thermal insulating layer). More specifically, the first water-blocking layer is desirably formed of at least one selected from titanium, tantalum, chromium, molybdenum, tungsten and iron and alloys containing thereof. The first water-blocking layer may have a thickness appropriately selected according to the type of the metal element forming thereof, the surface irregularity of the thermal insulating layer and the like, and may generally have a thickness within 0.02 to 0.8 μm in view of provision of the above function.

The water-blocking layer is desirably formed by physical vapour deposition that allows formation of films particularly in the substantial absence of water. Among others, the water-blocking layer is more desirably formed by sputtering. Sputtering is the method that allows formation of films in a sputtering device in a vacuum atmosphere, and thus the water-blocking layer can be formed while the surface irregularity or inside of the open pores of the zirconia thermal insulating layer is completely vacuum dried. On the surface and side surface of the zirconia thermal insulating layer as a base layer, the metal film of the first water-blocking layer is formed followed by formation of the second water-blocking layer formed of the conductive metal film so as to completely cover the exposed portion of the zirconia thermal insulating layer. Thereby the surface of the zirconia thermal insulating layer is completely isolated from a plating aqueous solution used in the subsequent metal film formation step by plating during the production process of the thermal insulated mold, and thus the thermal insulated mold can be provided without a bad effect by water (water vapour) that may initiate and promote deterioration of the zirconia thermal insulating layer during resin molding.

Metal Film

The metal film is formed of metal which may be the same material as those used for molding surfaces of well-known or commercially available molds. The metal may include, for example, metals such as iron, nickel, copper and chromium, alloys such as nickel-phosphorous alloys, nickel boron, nickel-tungsten-phosphorous alloys and nickel-copper-phosphorous alloys and the like.

The metal film may contain a single layer or more than one layer. For example, in order to improve the adhesiveness (bonding property) of the thermal insulating layer and the metal film, the metal film may have a two layer structure containing a first metal film and a second metal film, wherein the first metal film exists between the water-blocking layer and the second metal film as a bonding layer (primer layer). More specifically, the configuration may be employed which includes a metal plated film (first metal film) formed on the water-blocking layer and a microfabricated metal film (second metal film) formed on the metal plated film. In this case, regardless of the material of the water-blocking layer, a layer serving as a molding surface, i.e., the microfabricated metal film (second metal film) having been subjected to microfabrication (irregular surface), can be formed with preferable adhesiveness.

The metal film can be formed by any well-known methods according to, for example, the type of the metal species used, the composition of the base layer and the like. For example, one or more than one well-known thin film formation methods may be appropriately used such as plating (liquid phase deposition) including electrolytic plating and electroless plating; chemical vapour deposition including thermal CVD, MOCVD and RF plasma CVD; and physical vapour deposition including sputtering, ion plating, MBE and vacuum deposition. Particularly in the present invention plating can be suitably employed which may be liable to affect the thermal insulating layer due to water. Namely the thermal insulated mold of the present invention has the water-blocking layer and thus can effectively reduce or prevent deterioration of the zirconia thermal insulating layer due to water. Therefore the thermal insulated mold of the present invention allows resin molding without being adversely affected by plating. Meanwhile plating is more advantageous than other methods in terms of the cost and the like, and thus the resin molding can also be carried out with beneficial cost. Thus in the present invention plating can suitably be employed that is a wet process particularly using a plating solution containing water.

When the metal film has a multilayer structure, the respective layers may be formed by different methods which may be appropriately combined from the thin film formation methods described above. For example, the metal film including a first metal film which is a bonding layer (primer layer) and a second metal film formed thereon may be formed as follows: For example, a metal plated film (first metal film) such as a strike plated film is formed on the water-blocking layer by electrolytic plating and then a microfabricated metal film which has a higher thickness than the metal plated film may be formed on the metal plated film by plating. Accordingly, the bonding strength of the water-blocking layer and the metal film can be further improved.

The molding surface may be formed by the methods for forming well-known thermal insulated molds without limitation. For example, the molding surface having desired shape (irregular configurations) can be formed by subjecting the surface of the metal film to mechanical processing such as cutting operations.

The metal film in the present mold may generally have a thickness (in case of the multilayer structure, the total thickness of multiple layers) of, but is not limited to, 20 to 300 µm and particularly preferably 50 to 150 µm. In case of the multilayer structure, each layer may have the thickness that may be appropriately selected according to the number of layers, materials of the layers and the like.

Thermal Insulating Layer

The thermal insulating layer in the present mold is formed between the metal mold base material and the metal film providing the surface for molding. Accordingly, it can decrease or prevent a phenomenon that heat of the molten molding material is immediately deprived by the metal mold base material.

The thermal insulating layer is formed of a layer containing zirconia ($ZrO_2$) which is a film having high strength and high thermal insulating effect. It is particularly preferable that zirconia is formed of a crystal (polycrystal) in view of the mechanical strength and the like. In view of this, zirconia used may be suitably stabilized zirconia (particularly cubic zirconia crystal) particularly containing a stabilizing agent of an oxide such as CaO, MgO, CeO, $Y_2O_3$ and $HfO_2$, partially stabilized zirconia (particularly zirconia crystal containing a mixed phase of cubic and tetragonal crystals) and the like. Particularly, partially stabilized zirconia is more preferred because it can achieve further improved mechanical strength. The thermal insulating layer may contain, but is not limited to, 80 to 100% by weight and particularly 90 to 100% by weight of zirconia in the thermal insulated layer. Thus, the thermal insulating layer containing zirconia at 100% by weight may be suitably used. Such a thermal insulating layer may be, for example, zirconia materials such as zirconia sintered bodies and zirconia thermal-sprayed films. The thermal insulating layer can namely be formed by attaching a preliminarily prepared zirconia sintered body or by forming a zirconia film by thermal spraying. The zirconia material may be applied by the manners same as those for well-known thermal insulated molds. The zirconia sintered body may be suitably applied by, for example, forming a plate-shaped zirconia sintered body on a bonding layer formed on the surface of the metal mold base material and the zirconia sprayed film may be applied by forming the zirconia thermal-sprayed film directly on the surface of the metal mold base material by thermal spraying, or by forming the zirconia sprayed film by thermal spraying on a bonding layer which is preliminarily formed on the surface of the metal mold base material in order to improve the adhesiveness.

The thermal insulating layer may have any thickness without limitation and may have the thickness within, for example, the range of 50 µm to 100 mm that may be appropriately selected according to the type of the molding material, desired heat insulating properties and the like.

Use of Thermal Insulated Mold

The thermal insulated mold of the present invention can be used by the manners similar to well-known or commercially available molds. The molding conditions for molding using the mold may also follow known molding methods.

When molding is carried out with the present mold, the present mold may be used to form a part or whole molding space. For injection molding in the molding space formed by two molds, i.e., fixed and movable molds, the present mold can be used as at least one of the fixed and movable molds. A part or whole of a commercially available mold (molding device) may be merely replaced by the present mold to carry out molding with the present mold.

Figure 10:
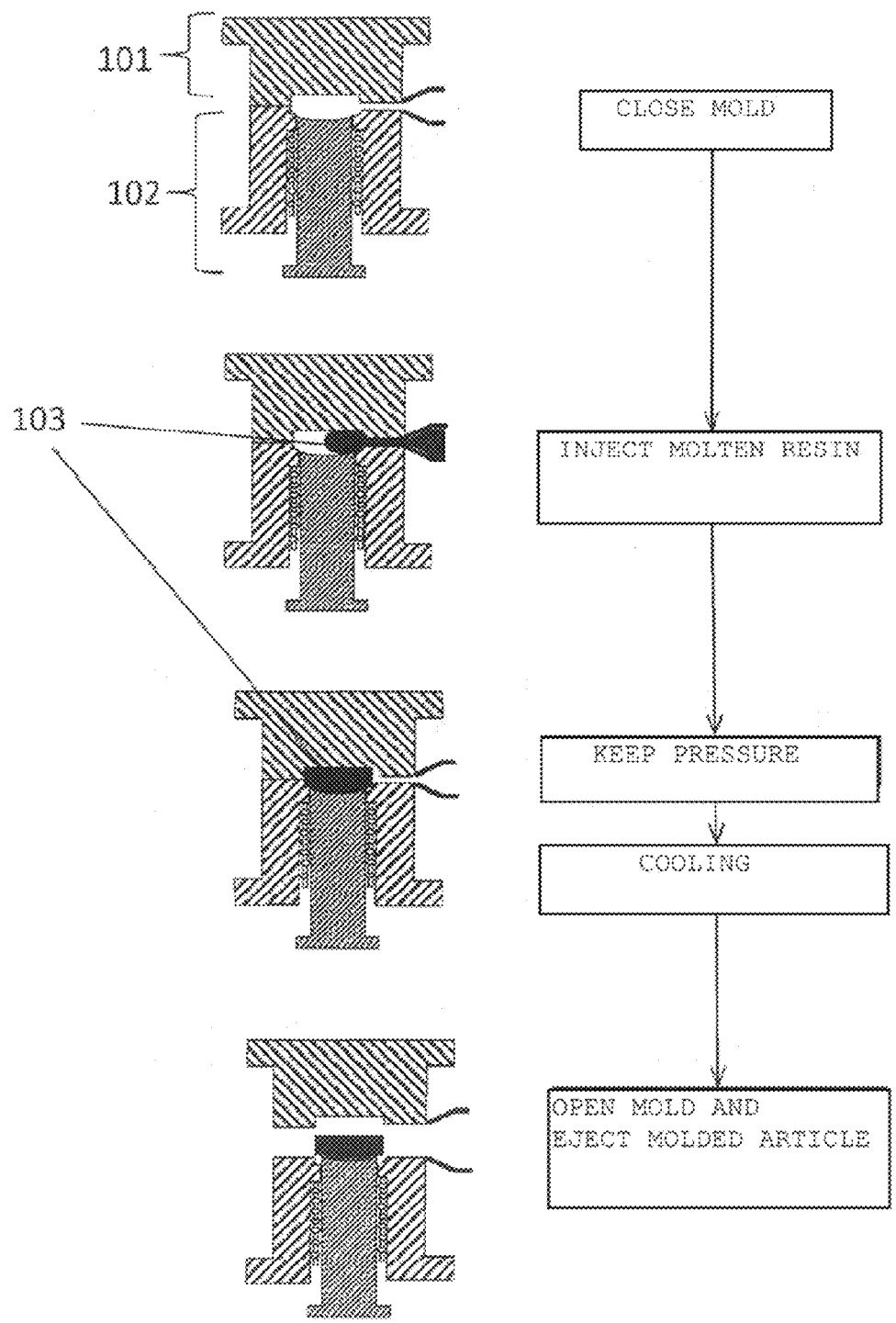
FIG. 10 is a view illustrating exemplary steps of molding of a molten resin using the mold of the present invention.

FIG. 10 shows a schematic view of exemplary steps of molding of a molding material with a mold including a fixed mold and a movable mold, wherein the movable mold is the present mold. In FIG. 10, a mold including a fixed mold 101 and a movable mold 102 is used as a molding apparatus. A molten resin 103 is introduced into a space (molding space) between the fixed and movable molds by injection and is then cooled while pressing as shown in the figure. The movable mold 102 is then descended to open the mold and a desired molded resin is then released and recovered. In this case, the movable mold 102 is the present mold and thus the present mold has predetermined shape on the molding surface thereof. Due to the thermal insulating layer in the present mold, the molten resin is not immediately deprived of heat by the mold and thus is distributed across the irregularity or grooves on the molding surface while maintaining the low viscosity thereof even when the molten resin is injected and introduced into the molding space in the mold, resulting in precise transfer of the shape to the resin. Thus the molded article having precise reproduction of fine shape can be obtained.

Molding Material

The present insulated mold may be used for molding of any material (molding material) without particular limitation; however, it is particularly suitable for molding (injection molding and the like) of compositions containing resin components (particularly resin compositions containing resin components as a main component).

The present insulated mold may be suitably used for resin molding for example. Suitable examples of the resin component (particularly synthetic resin) may include thermoplastic resins such as polyethylene, polypropylene, polystyrene, polyvinyl chloride, polymethyl methacrylate, polyamide, polycarbonate, ABS resin, polyethylene terephthalate and polytetrafluoroethylene as well as polycycloolefins. The composition may also contain, in addition to the resin component, a filler, a colorant, a UV absorbing agent, an antistatic agent, a flame retardant and the like, if necessary.

2. Production Method of Thermal Insulated Mold

The method for producing the present insulated mold can be carried out by following the formation methods of the respective layers as described in the above 1. Particularly, according to the present invention, the present mold can be suitably produced by the method for producing the thermal insulated mold characterized in that the method includes the steps of:

(1) forming a thermal insulating layer comprising zirconia on a molding surface side of a metal mold base material (thermal insulating layer formation step);

(2) forming a water-blocking layer on the thermal insulating layer by physical vapour deposition (water-blocking layer formation step);

(3) forming a metal film on the water-blocking layer by plating (metal film formation step); and (4) providing machining on the metal film to form a transfer configuration surface for resin molding (molding surface formation step).

Thermal Insulating Layer Formation Step

In the thermal insulating layer formation step, a thermal insulating layer comprising zirconia is formed on a molding surface side of a metal mold base material. The material and the like of the thermal insulating layer including zirconia may be as described in the above 1. Particularly, it is desirable to apply the method using a zirconia sintered body or a zirconia thermal-sprayed film.

In the present invention, it is also preferable that the thermal insulating layer is formed on an adhesive layer that is formed on the metal mold base material in order to improve the adhesiveness of the thermal insulating layer including zirconia and the metal mold base material. The material for the adhesive layer may be appropriately selected among well-known or commercially available bonding materials depending on the material of the metal mold base material, and may suitably be a brazing material and the like containing a metal or an alloy.

When a zirconia sintered body is used, it is desirable that the thermal insulating layer is formed by the method including the steps of (1-1) arranging a bonding layer on the molding surface side of the mold base material formed of the metal; (1-2) arranging a zirconia sintered body on the bonding layer; and (1-3) applying pressure on the plate-like zirconia sintered body while heating to form the thermal insulating layer on the bonding layer.

When a zirconia sprayed film is used, it is desirable that the thermal insulating layer is formed by the method including the steps of (1-1) forming a bonding layer on the molding surface side of the metal mold base material by spraying; and (1-2) forming the thermal insulating layer including zirconia on the bonding layer by thermal spraying.

More specifically, the above methods are preferably carried out as follows. Namely, it is preferable that the thermal insulating layer including zirconia is formed by 1) a method wherein a bonding material sheet such as a silver-alloy brazing filler is set on the molding surface side of the metal mold base material, a plate-shaped zirconia sintered body that is the thermal insulating layer is arranged on the bonding material so that the zirconia sintered body is attached to the bonding material and pressure and heat is applied along the stacking direction in order to bond the layers, or by 2) a method wherein a bonding material such as a nickel-chromium-aluminium-yttrium alloy is formed on the molding surface side of the metal mold base material by thermal spraying and a zirconia thermal-sprayed film is formed on the bonding material by thermal spraying.

Water-Blocking Layer Formation Step

In the water-blocking layer formation step, the water-blocking layer is formed on the thermal insulating layer by physical vapour deposition. The material of the water-blocking layer is as described in the above 1. As shown in FIG. 11, it is desirable that the water-blocking layer is formed so as to cover all exposed surfaces of the thermal insulating layer in order to further secure the water-blocking effect.

Physical vapour deposition (PVD) is not limited and may include, for example, sputtering, ion plating, MBE, vacuum deposition and the like, among which sputtering is particularly preferred. Sputtering allows formation of the water-blocking layer in a vacuum container of a sputtering device and thus allows removal of adsorbed water on the irregular surface of the zirconia thermal insulating layer and removal of water in the open pores in the thermal insulating layer by complete vacuum drying. Sputtering may be carried out with a well-known or commercially available sputtering device. Particularly, a DC magnetron sputtering device or an RF magnetron sputtering device is preferable in the present invention. The conditions for sputtering are not limited and it is desirable to employ particular conditions of argon being inert gas, 0.2 to 2.0 Pa of a degree of vacuum and 50 to 300° C. of the substrate temperature.

The water-blocking layer may be a single layer or include multiple layers. Particularly, the water-blocking layer preferably includes a first water-blocking layer for rigid adhesion to the zirconia thermal insulating layer and a second water-blocking layer having water permeation prevention effect and preferable conductivity in order to allow subsequent formation of the plated film.

Namely, it is desirable that the step of forming the water-blocking layer is a plural step of a step of forming a first water-blocking layer formed of a bonding film to the thermal insulating layer by sputtering and a step of forming a second water-blocking layer formed of a conductive metal film by sputtering.

The first water-blocking layer is particularly preferably formed of a metal that is liable to be oxidized to form a rigid oxide film thereon. The metal is preferably titanium (Ti), tantalum (Ta), chromium (Cr), molybdenum (Mo), tungsten (W) and alloys containing thereof. The bonding layer that is the first water-blocking layer may have a thickness that may be appropriately selected according to the type of the metal element forming the first water-blocking layer, the thickness or the surface irregularity of the thermal insulating layer and may generally be in the range of about 0.02 to 0.8 µm.

The second water-blocking layer is not particularly limited as far as it is formed of a conductive metal and may be formed of a metal that allows formation of a dense film by sputtering and allows formation of a rigid metal plated film by electrolytic plating. The conductive metal film may suitably contain, for example, a metal such as copper and iron and an alloy such as copper alloys and iron alloys. The second water-blocking layer may have a thickness that may be appropriately selected according to the type of the metal element forming the second water-blocking layer and the surface irregularity of the insulting layer and may generally be in the range of 2 to 20 µm.

Metal Film Formation Step

In the metal film formation step, a metal film is formed on the water-blocking layer by plating. In this case, the metal film may be formed on the conductive metal film by plating according to a well-known method; however it is particularly preferable to follow the following method. Namely, a method is preferable in which the conductive metal film forming the water-blocking layer is used as an electrode to form a base layer electroplated film followed by formation of the metal film by electroless plating. The base layer electroplated film is particularly desirably formed by Ni strike plating. The metal film formed thereon by electroless plating is particularly preferably a nickel-phosphorous alloy plated film. The strike plating and electroless plating may follow well-known methods.

Molding Surface Formation Step

In the molding surface formation step, the metal film is subjected to machining to forma transfer pattern for resin molding. Machining may be carried out according to well-known methods. Desirable configurations (uneven configurations) may be formed on the metal film with a well-known or commercially available precision cutter and the like.

EXAMPLES

The features of the present invention are more specifically described by way of Examples shown below. The scope of the invention is however not limited to Examples.

Example 1

[Thermal Insulated Mold Having a Thermal Insulating Layer Formed of a Zirconia Sintered Body]

FIG. 1 shows a section view illustrating the configuration of a thermal insulated mold 1 of the present invention having a thermal insulating layer formed of a zirconia sintered body of Example 1. The thermal insulated mold 1 is a mold used for forming resin components having precision microfabricated configurations and has a shape such that two cylinders with different diameters are stacked with the same central axis. Namely, the mold has a shape such that a cylinder with low height of 7.5 mm (diameter: 40.0 mm) and a cylinder with a height of 32.6 mm (diameter: 35.0 mm) are stacked.

The material for a mold base material 2 formed of metal was stainless steel having high hardness. The mold base material 2 formed of metal has a shape of a cylinder having a height including a cylinder with low height of 7.5 mm from the bottom of 40.0 mm and the shape of the molding surface thereof is a cylinder having a diameter of 35.0 mm (height: 32.5 mm). The mold base material 2 formed of metal has a recessed upper surface so that a central circular disk (diameter: 32.0 mm, depth: 0.3 mm) is removed and the outer circumference having a width of 1.5 mm remains. In the recessed part a thermal insulating layer 4 (thickness: 0.30 mm) formed of a zirconia sintered body is arranged and fixed through a bonding layer 3 (thickness: 0.04 mm) formed of a silver brazing alloy. A water-blocking layer 7 is arranged so as to cover the surface of the thermal insulating layer 4, onto which a metal film 10 is arranged. The water-blocking layer 7 has a first water-blocking layer 5 (thickness: 0.2 μm) which is a bonding film formed of titanium on the side contacting to the thermal insulating layer 4 in order to provide an increased adhesiveness with an oxide surface therebelow (the surface of the zirconia sintered body and the surface of a passivation film of stainless steel) and a second water-blocking layer 6 (thickness: 2 μm) as an upper layer formed of copper having high conductivity. The metal film 10 is formed on the second water-blocking layer 6. The metal film 10 comprises a first metal film 8 (thickness: 2 μm) which is a plated primer layer film formed of nickel and a second metal film 9 (maximum thickness: 100 μm) which is formed on the first metal film 8 and is a metal film for microfabrication formed of an amorphous nickel-phosphorous alloy. The second metal film 9 has a molding surface which is a precision processed surface 9a with fine patterns for resin molding having a maximum depth of 28 μm formed by precision machining.

According to the above configuration, the plate-shaped zirconia sintered body constituting the thermal insulating layer having low thermal conductivity does not contact water in the plating step during formation of the metal film during production of the thermal insulated mold, and thus deterioration (deterioration at low temperatures, etc.) of the zirconia sintered body can be limited. Therefore, the thermal insulated mold allows molding of resins having preferable fine patterns for a prolonged period of time.

Figure 2:
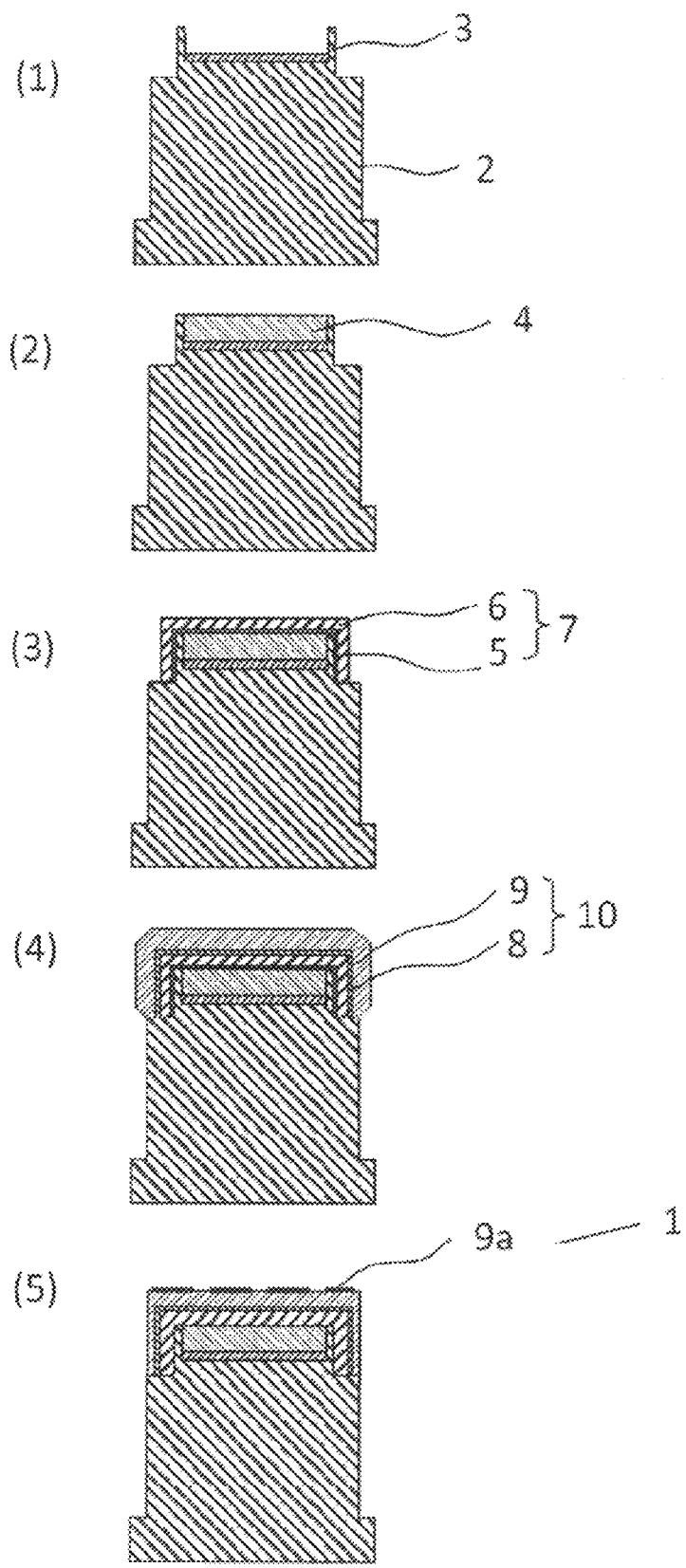
FIG. 2 is a view illustrating preparation steps of the thermal insulated mold of Example 1 of the present invention.

FIG. 2 shows production steps of the thermal insulated mold 1 of the present invention. A mold base material 2 formed of stainless steel that was processed to have a dimension slightly bigger than that of the mold base material described above was prepared. Thus, the mold base material 2 formed of metal has a structure such that two cylinders are stacked with the same central axis. The mold base material has the structure including a cylinder with low height of 7.7 mm (diameter: 40.2 mm) and a cylinder with a height of 32.4 mm (diameter: 35.2 mm) stacked thereon. The upper surface thereof is machined to be recessed such that a cylinder with low height of 0.34 mm (diameter: 32.0 mm) and with the same central axis as the cylinders is removed. The upper surface is further machined to form a step with a width of 0.5 mm except for the outer circumference of a cylinder having a diameter of 34.8 mm and having the same central axis. A sheet-shaped silver brazing alloy material (diameter: 31 mm, thickness: 0.05 mm) was inserted in the recessed part (depth: 0.34 Tim, diameter: 32.0 mm) formed on the molding surface side of the mold base material 2 formed of metal (FIG. 2 (1)).

A disc-shaped, partially stabilized zirconia sintered body (composition: $ZrO_2/Y_2O_3/HfO_2=96.0/3.1/0.9$ (mol % ratio) and dimensions: diameter 31.5 mm×thickness 0.30 mm) having one surface being preliminarily metallized was prepared, which was arranged on the mold base material 2 so that the metallized surface was the undersurface. Heat treatment at 750° C. in a vacuum furnace was carried out while applying pressure so as to be parallel to the molding surface of the mold to join the thermal insulating layer 4 formed of the plate-shaped zirconia sintered body with the mold base material 2 formed of metal through the bonding layer 3. The silver blazing alloy protruding from the molding surface of the mold at this occasion was removed by machining. Moreover, in order to correct the strain generated by the heat treatment, the external dimension of the metal mold base material shown in FIG. 1 was modified by precision machining (FIG. 2 (2)).

A water-blocking layer 7 was then formed on the thermal insulating layer 4 with a dual radio frequency magnetron sputtering device having a planetary rotation system and a reverse sputtering function allowing arrangement of two kinds of targets with a diameter of 6 inches (FIG. 2 (3)). Namely for the metal mold base material having the layers up to the thermal insulating layer 4, the side surface of the cylinder of the mold base material 2 formed of metal having the thermal insulating layer 4 bonded thereto was masked at the lower part thereof except for the upper portion processed to have the step. In the sputtering device, the metal mold base material was then attached on a substrate holder so as to have an angle of 30° with the target and a double layer sputtering film was formed as follows on the zirconia sintered body while rotating the substrate holder in a planetary manner. Thus, in the sputtering device including a metallic titanium target and a metallic copper target, the metal mold base material having the layers up to the zirconia sintered body after washing was attached to the substrate holder and heated to 150° C. for 1 hour while vacuuming.

Reverse sputtering was then carried out to the surface of the metal mold base material on which the sputtering film was to be formed with sputtering gas of argon and a degree of vacuum of 8 Pa in order to carry out surface cleaning. Sputtering was thereafter carried out for 2 minutes with the metallic titanium target at a degree of vacuum of 0.6 Pa and input power for sputtering of 2 kW while rotating the substrate holder in a planetary manner in order to form a first water-blocking layer (titanium) 5 having a thickness of 0.2 µm. A dense second water-blocking layer (copper) 6 having a thickness of 1 µm was sequentially formed with the metallic copper target by sputtering for 2.5 minutes at the same degree of vacuum and input power for sputtering of 2 kW, thereby obtaining the water-blocking layer 7 having a double layer structure. The thickness of the water-blocking layers was determined based on the period of sputtering and a calibration curve generated by measuring the thickness of films formed on a glass substrate attached to the substrate holder with various periods of film formation. The sputtering device was used for formation of the water-blocking layer 7 in order to thoroughly remove water vapour in air adsorbed on the surface of the thermal insulating layer which was the primer layer before formation of the film. Titanium is liable to form a rigid oxide film in the presence of oxygen. Thus the metallic titanium film was formed so that the titanium film at the interface reacts with an oxygen component in the thermal insulating layer immediately below the titanium film of the first water-blocking layer 5 to increase the adhesion strength. The copper film of the second water-blocking layer 6 thereon plays a role for increasing the adhesion strength by bonding to the titanium film therebelow as well as complete coverage of the surface of the thermal insulating layer due to the thickness of the copper film. Thus the second water-blocking layer 6 can completely block entrance of a plating solution to the zirconia sintered body in the thermal insulating layer 4 in the subsequent plating step. The second water-blocking layer 6 also has high conductivity and thus plays a role for allowing uniform formation of the metal film layer 10 thereon with high adhesiveness by plating.

A first metal film layer 8 (nickel) having a thickness of 2 µm was then formed by nickel strike plating. A second metal film layer 9 (amorphous nickel-phosphorous alloy) having a thickness of 250 µm for precision processing was further formed by electroless nickel plating. The metal film layer 10 including the first metal film layer 8 and the second metal film layer 9 formed thereon was thus prepared and subjected to heat treatment at 200° C. for 3 hours (FIG. 2 (4)).

The metal film layer 10 was then processed on the side surface thereof with a precision cutting machine so that the side surface aligned to the side surface of the cylinder of the mold base material 2 formed of metal. The second metal film layer 9 was then subjected to precision grinding to form a precision processing surface 9a, thereby obtaining the thermal insulated mold 1 (FIG. 2 (5)).

Evaluation of Deterioration of Thermal Insulating Layer

Figure 3:
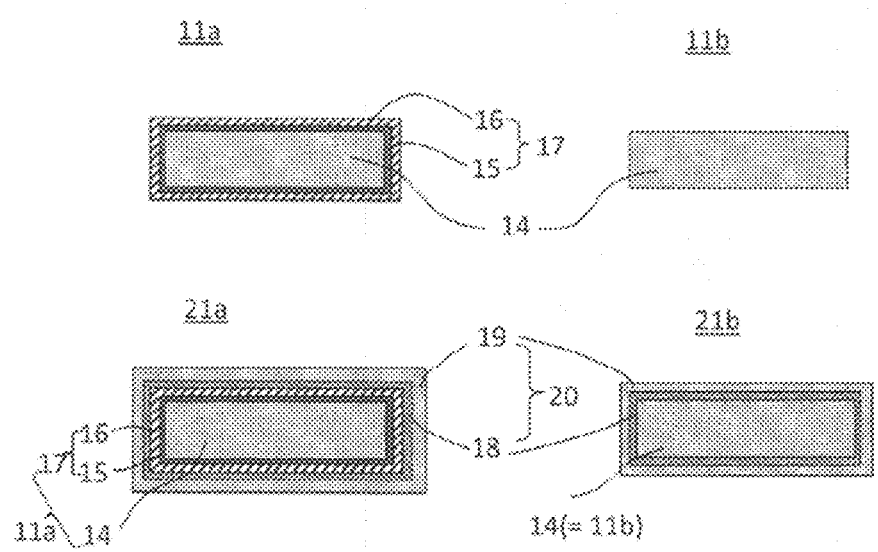
FIG. 3 is a schematic section view of an evaluation specimen of the structure of the thermal insulated mold of Example 1 of the present invention and an evaluation specimen of the structure of a conventional thermal insulated mold.

In order to evaluate deterioration of thermal insulating layers, samples having the sectional structure of films shown in FIG. 3 were used. Two insulating substrates 14 (30 mm long, 30 mm wide, 6 mm thick) formed of zirconia sintered bodys having the same compositions and prepared under the same conditions as the disc-shaped zirconia sintered body of the thermal insulating layer 4 shown in FIG. 1 were prepared. A water-blocking layer 17 including a titanium film as a first water-blocking layer 15 (thickness: 0.2 µm) and a copper film as a second water-blocking layer 16 (thickness: 1 µm) was formed on the whole surface of one of the substrates by exactly the same manner as formation of the water-blocking layer 7 of the thermal insulated mold 1 of the present invention to obtain a first sample 11a. The other substrate served as a first comparative sample 11b without formation of a water-blocking layer.

Figure 4:
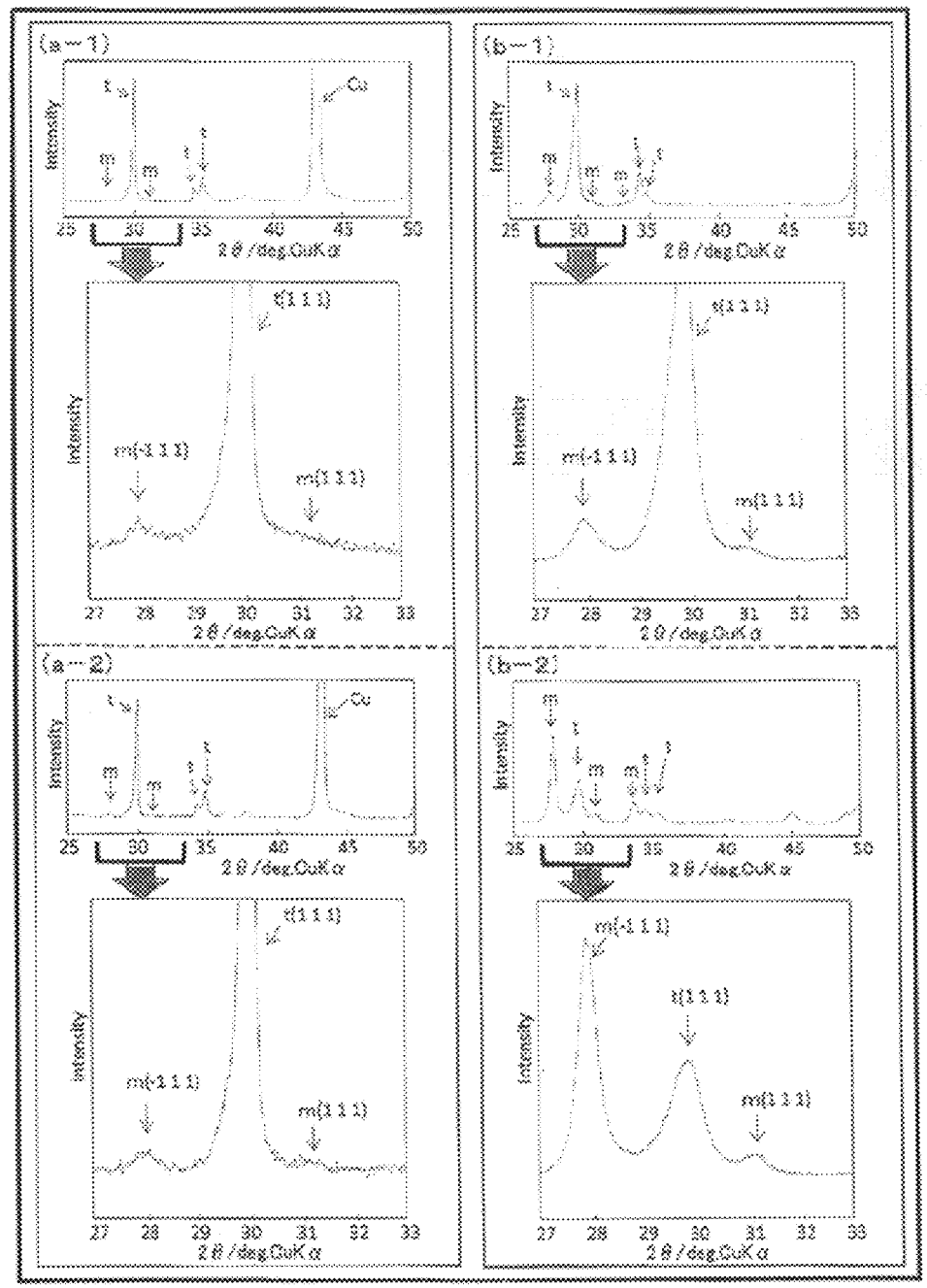
FIG. 4 is a view illustrating X-ray diffraction patterns of the evaluation specimen of the structure of the thermal insulated mold of Example 1 of the present invention and the evaluation specimen of the structure of a conventional mold before and after the deterioration evaluation test.

The first sample 11a and the first comparative sample 11b were evaluated in an accelerated test of deterioration thereof under a wet atmosphere as follows with an autoclave having a stainless steel pressure resistant container. The first sample 11a and the first comparative sample 11b were placed in pure water which was poured in a stainless steel cylindrical container (diameter 20 cm×depth 20 cm) to the height of 10 cm without being overlapped and the container was sealed. The cylindrical container was then heated to 250° C. to create a hydrothermal environment and was cooled to room temperature after a certain period of time. The samples were subjected to analysis of crystal phases of the zirconia sintered body with an X-ray diffractometer and the appearances were observed. The heating condition in the autoclave was as follows: heating from room temperature to 250° C. over about 0.5 hours; holding at 250° C. for a certain amount of time; and cooling to room temperature over about an hour, followed by X-ray diffractometry at room temperature. By repeating these procedures, the relationship between the accumulated time of the holding time at 250° C. and deterioration was evaluated. The first comparative sample 11b serves as a model of conventional thermal insulated molds consisting only of a zirconia sintered body during resin molding. Namely the hydrothermal environment used in the present evaluation test is similar to the environment for resin molding at a temperature of 100° C. or higher in a thermal insulated mold containing a metal film layer which is formed on an thermal insulating layer by plating while water confined between the zirconia sintered body and the metal film layer is in contact with the surface of the zirconia sintered body. However, in order to carry out the test in an accelerated manner, the hydrothermal temperature used was 250° C. which was slightly higher than the normal resin molding temperature. Meanwhile the first sample 11a serves as a model for the thermal insulated mold of the present invention which includes the water-blocking layer, so that the zirconia sintered body is not in contact with the confined water described above. The zirconia sintered body was analyzed for deterioration in the crystal phase in a wet atmosphere under the hydrothermal environment. The panels (a-1) and (b-1) in FIG. 4 show X-ray diffraction patterns using CuKα radiations of the crystal phases of the first sample 11a and the first comparative sample 11b before the hydrothermal treatment at 250° C. Each upper panel shows the X-ray diffraction pattern in the range of 2θ of 25 to 50° and each lower panel shows the X-ray diffraction pattern in the range of 2θ of 27 to 33° which was measured in order to precisely evaluate crystal transition.

The first sample 11a contains the water-blocking layer 17 which is a stacked film of copper (upper layer) having a relatively high thickness and titanium (lower layer) having an extremely low thickness on the surface of the insulating substrate 14 formed of zirconia sintered body, and thus the X-ray diffraction pattern (FIG. 4 (a-1)) of the first sample 11a shows a large peak at 2θ=43.30° that is attributable to the metallic copper film of the surface layer. However, as the zirconia sintered body is located below the copper film, the intensity of peaks attributable to zirconia is low. In the X-ray diffraction pattern in the panel (a-1) in FIG. 4, peaks derived from cuprous oxide (CuO) are observed. These peaks are attributable to copper oxide produced by oxidation of the surface of the metallic copper, which is considered to be an oxide film produced on the surface of the first sample 11a used for the experiment which was left to stand in air for a day and a night after formation of the water-blocking layer 17 in the sputtering device.

Zirconia ceramics usually show (1 1 1) diffracted peaks of the respective cubic, tetragonal and monoclinic crystal phases at around 2θ=30°. However, when the crystal phases are mixed, it is difficult to separate them, so that it is difficult to evaluate the proportion of the phases. It is known that when the tetragonal crystal phase undergoes phase transition to the monoclinic crystal phase, a diffraction peak derived from the monoclinic crystal phase (-1 1 1) appears at around 2θ=28°. Phase transition can be confirmed by an increase in the peak. In the figure, the diffracted peak attributable to the tetragonal crystal phase is designated as "t" and the diffracted peak attributable to the monoclinic crystal phase is designated as "m".

It was found that in the first comparative sample 11b, the monoclinic crystal phase was increased while the tetragonal crystal phase was decreased in the zirconia sintered body under the hydrothermal atmosphere of 250° C. An X-ray diffraction pattern of the crystal phases of the first comparative sample 11b after the hydrothermal treatment at 250° C. for 30 minutes is shown in the panel (b-2) in FIG. 4. It is apparent that the (-1 1 1) peak of the monoclinic crystal phase was increased and the peak (attributable to the tetragonal crystal phase peak) around 2θ=30° was decreased after the hydrothermal treatment. The first comparative sample 11b had a decreased strength such that a part of the surface thereof was collapsed and broken after an exposure to the hydrothermal environment for 12 hours and that the sample itself could be broken by hand after the exposure for 20 hours. The evaluation results are shown under "Comp. sample 11b" in Table 1. The change in the crystal phases by the hydrothermal treatment shown in the table was determined from the change in the intensities of the peaks derived from the tetragonal crystal and the peaks derived from the monoclinic crystal in the X-ray diffraction patterns of the samples before and after the hydrothermal treatment.

The change described above is well known as a phenomenon that occurs during deterioration under wet and low temperature conditions of zirconia ceramics. The mechanism of the phenomenon is generally believed to be as follows: thus the surface of the zirconium oxide crystal particles in the internal tetragonal crystal phase forming a zirconia sintered body is converted to hydroxide by means of water under the hydrothermal environment. Thereby the crystal particles forming the zirconium oxide sintered body are gradually converted to monoclinic crystal phases. The conversion is accompanied by significant volume expansion that causes cracks. The tetragonal crystal phase portions at the surfaces that are generated by cracks then contact water in the hydrothermal environment, resulting in the cycles of conversion to hydroxide, conversion to the monoclinic crystal phases and volume expansion. Thus the above phenomenon may be caused by deepening and development of the cracks over time.

On the other hand, the first sample 11a with the water-blocking layer 17 having the same structure as the water-blocking layer 7 of the thermal insulated mold 1 of the present invention as shown in FIG. 1 did not show the change in the X-ray diffraction pattern attributable to the zirconia sintered body before and after the hydrothermal treatment at 250° C. for 20 hours, the sample itself kept the strength, so that it could not be broken by hand (evaluation results are shown under "Ex. 1" in Table 1). The X-ray diffraction pattern after the hydrothermal treatment for 30 minutes is shown in the panel (a-2) in FIG. 4. The peak intensities of the tetragonal crystal phase and monoclinic crystal phase attributable to the zirconia sintered body are not altered. The X-ray diffraction pattern shown in the panel (a-2) in FIG. 4 shows a peak attributable to cupric oxide ($Cu_2O$), which may be a copper oxide film generated by the hydrothermal treatment of copper oxide (CuO) or metal copper on the surface of the metal copper film of the second water-blocking layer 17.

As described above, it is demonstrated that the thermal insulated mold 1 of the present invention can contribute to an increase in the life time of the thermal insulated mold which has the water-blocking layer and thereby causing decreased deterioration in the strength of the insulating layer 4 formed of the zirconia sintered body during the use thereof for resin molding for a prolonged period of time.

Evaluation of Adhesiveness of Insulating Layer and Metal Film

In the present Example, adhesiveness of the insulating layer 4, the water-blocking layer 7 and the metal film 10 was also examined. The test for adhesiveness was carried out by the instrument shown in FIG. 5. On a freshly prepared sample having the same shape as and prepared as the first sample 11a used for the evaluation of deterioration of the insulating layer, a metal film 20 formed of stacked films composed of a first metal film 18 (a nickel plated film having a thickness of 2 μm) and a second metal film 19 (an amorphous nickel-phosphorous plated film having a thickness of 30 μm) was formed by the same manner as the thermal insulated mold 1 of the present invention, thereby preparing a second sample 21a having the section structure as shown in FIG. 3. The metal film formed on the lower surface of the second sample 21a is bonded across the whole surface thereof (30 mm×30 mm) to a substrate plate component 12 made of iron which is a square measuring 100 mm per side and has a thickness of 10 mm by means of a bonding layer 13 of an epoxy adhesive and the substrate component 12 is screwed to a measurement stage 23. Meanwhile a rectangular cylinder component 22 (a square measuring 10 mm per side and a length of 40 mm) made of stainless steel was attached at the whole lower surface thereof (10 mm×10 mm) to the central part of the metal film formed on the upper part of the sample 21a by means of the same epoxy adhesive, a hook is attached at the centre of the upper surface of the rectangular cylinder component 22 to which a screw hole was preliminarily provided and the metal film surface was pulled by means of load due to a weight 27 through a wire rope 26. In this instrument, the weight 27 attached to one end of the wire rope provides, by means of a trochlea 25 provided at the upper portion of a support post 24 standing on the measurement stage 23, force for detaching the second metal film 19 bonded to the rectangular cylinder component 22 with the bonding layer 13 therebetween from the insulating substrate 14 formed of the zirconia sintered body, allowing measurement of adhesiveness of the whole stacked structure of the thermal insulated mold of the present invention.

Three kinds of the weight 27, i.e., 5 kg, 10 kg and 15 kg, were prepared. For example, the above method using the weight of 10 kg corresponds to the examination in which the central part of 1 cm² of the metal film 20 at the upper surface of the second sample 21a is detached with force of 10 kg weight. If the adhesiveness is low in this test, defects such as blisters occur on the metal film when strong force for detachment is applied at the time of removing the formed resin after using the thermal insulated mold formed of the stacked structure, causing problems on precision transfer.

In the present Example, the first sample 11a as the water-blocking layer 17 which included the titanium film (thickness: 0.2 μm) stacked with the copper film (thickness: 1 μm) was used for the test of adhesiveness. As a result, the metal film 20 did not have blisters on the surface thereof even in the test using the weight 27 of 15 kg. Thus it is demonstrated that there is high adhesiveness between the zirconia sintered body, the water-blocking layer 17 and the metal film layer 20. This result is also shown in Table 1 under "Ex. 1" together with the evaluation of deterioration of the insulating layer. In the table, occurrence of a blister in the metal film is designated as "X" and no change in the appearance is designated as "◯".

As a comparative sample for the evaluation of adhesiveness, a second comparative sample 21b was prepared by directly forming a metal film 20 formed of stacked films composed of a first metal film 18 (a nickel plated film having a thickness of 2 μm) and a second metal film 19 (an amorphous nickel-phosphorous plated film having a thickness of 30 μm) on a freshly prepared comparative sample having the same shape as the first comparative sample 11b shown in FIG. 3 for evaluation of deterioration of the insulating layer by the same manner as the thermal insulated mold 1 of the present invention. Adhesiveness was evaluated by using the second comparative sample 21b instead of the second sample 21a. As a result, no blister was generated on the surface of the metal film 20 in the test using the weight 27 of 10 kg; however the metal film 20 was observed to have film lifting on the surface thereof when the weight was 15 kg. Thus, the application of force of 15 kg/cm$^2$ caused detachment of the metal film 20 from the insulating substrate 14 formed of the zirconia sintered body.

Example 2

[Thermal Insulated Mold Having a Thermal Insulating Layer Formed of a Zirconia Sintered Body]

A thermal insulated mold was prepared by employing a titanium film of 0.1 μm thickness and a copper film of 10 μm thickness respectively as the first water-blocking layer 5 and the second water-blocking layer 6 forming the water-blocking layer 7 in the thermal insulated mold of the present invention in Example 1. The stacked films forming the water-blocking layer were formed by the same manner as Example 1 except that the period of film formation of the titanium film and the copper film was 1 minute and 25 minutes, respectively. Evaluation of deterioration of the thermal insulating layer and evaluation of adhesiveness of the thermal insulating layer and the metal film were carried out by the similar manner as Example 1 with the samples prepared as those used for the evaluation test in Example 1 as shown in FIG. 3. The results are shown in Table 1. As apparent from the results in Table 1, the water-blocking layer effectively functions with the configuration of Example 2.

Example 3

[Thermal Insulated Mold Having a Thermal Insulating Layer Formed of a Zirconia Sintered Body]

Samples similar to the first and second samples as shown in FIG. 3 in Example 1 were prepared and subjected to evaluation of deterioration of the thermal insulating layer and evaluation of adhesiveness of the thermal insulating layer and the metal film similar to Example 1. The first water-blocking layer 15 and the second water-blocking layer 16 forming the water-blocking layer 17 were respectively a titanium film of 0.02 μm thickness and a copper film of 4 μm thickness. The stacked films forming the water-blocking layer were formed by the same manner as Example 1 except that the period of film formation of the titanium film and the copper film was 12 seconds and 10 minutes, respectively. Evaluation of deterioration of the thermal insulating layer and evaluation of adhesiveness of the thermal insulating layer and the metal film were carried out by the similar manner as Example 1 with the samples prepared as those used for the evaluation test in Example 1 as shown in FIG. 3. The results are shown in Table 1. As apparent from the results in Table 1, the water-blocking layer effectively functions with the configuration of Example 3.

Example 4

[Thermal Insulated Mold Having a Thermal Insulating Layer Formed of a Zirconia Sintered Body]

In the same manner as Example 3, the first water-blocking layer 15 and the second water-blocking layer 16 prepared were respectively a titanium film of 0.2 μm thickness and a copper film of 20 μm thickness. The stacked films forming the water-blocking layer were formed under the same film formation conditions as Example 3 except that the period of film formation of the titanium film and the copper film was 2 minutes and 50 minutes, respectively. Evaluation of deterioration of the thermal insulating layer and evaluation of adhesiveness of the thermal insulating layer and the metal film were carried out by the similar manner as Example 1 with the samples prepared as those used for the evaluation test in Example 1 as shown in FIG. 3. The results are shown in Table 1. As apparent from the results in Table 1, the water-blocking layer effectively functions with the configuration of Example 4.

Example 5

[Thermal Insulated Mold Having a Thermal Insulating Layer Formed of a Zirconia Sintered Body]

In the same manner as Example 3, the first water-blocking layer 15 and the second water-blocking layer 16 prepared were respectively a titanium film of 0.8 μm thickness and a copper film of 8 μm thickness. The stacked films forming the water-blocking layer were formed under the same film formation conditions as Example 3 except that the period of film formation of the titanium film and the copper film was 8 minutes and 20 minutes, respectively. Evaluation of deterioration of the thermal insulating layer and evaluation of adhesiveness of the thermal insulating layer and the metal film were carried out by the similar manner as Example 1 with the samples prepared as those used for the evaluation test in Example 1 as shown in FIG. 3. The results are shown in Table 1. As apparent from the results in Table 1, the water-blocking layer effectively functions with the configuration of Example 5.

Example 6

[Thermal Insulated Mold Having a Thermal Insulating Layer Formed of a Zirconia Sintered Body]

In the same manner as Example 3, the first water-blocking layer 15 and the second water-blocking layer 16 prepared were respectively a tantalum film of 0.05 μm thickness and a copper film of 8 μm thickness. The stacked films forming the water-blocking layer were formed by replacing the titanium target in the sputtering device with a tantalum target having the same size. The films were prepared under the same film formation conditions as Example 3 except that the period of film formation of the tantalum film and the copper film was 26 seconds and 20 minutes, respectively. Evaluation of deterioration of the thermal insulating layer and evaluation of adhesiveness of the thermal insulating layer and the metal film were carried out by the similar manner as Example 1 with the samples prepared as those used for the evaluation test in Example 1 as shown in FIG. 3. The results are shown in Table 1. As apparent from the results in Table 1, the water-blocking layer effectively functions with the configuration of Example 6.

Example 7

[Thermal Insulated Mold Having a Thermal Insulating Layer Formed of a Zirconia Sintered Body]

In the same manner as Example 6, the first water-blocking layer 15 and the second water-blocking layer 16 prepared were respectively a tantalum film of 0.2 μm thickness and a copper film of 8 μm thickness. The stacked films forming the water-blocking layer were formed under the same film formation conditions as Example 6 except that the period of film formation of the tantalum film and the copper film was 1 minute and 45 seconds and 20 minutes, respectively. Evaluation of deterioration of the thermal insulating layer and evaluation of adhesiveness of the thermal insulating layer and the metal film were carried out by the similar manner as Example 1 with the samples prepared as those used for the evaluation test in Example 1 as shown in FIG. 3. The results are shown in Table 1. As apparent from the results in Table 1, the water-blocking layer effectively functions with the configuration of Example 7.

Example 8

[Thermal Insulated Mold Having a Thermal Insulating Layer Formed of a Zirconia Sintered Body]

In the same manner as Example 3, the first water-blocking layer 15 and the second water-blocking layer 16 prepared were respectively a chromium film of 0.2 μm thickness and a copper film of 8 μm thickness. The stacked films forming the water-blocking layer were formed by replacing the titanium target in the sputtering device with a chromium target having the same size. The films were prepared under the same film formation conditions as Example 3 except that the period of film formation of the chromium film and the copper film was 50 seconds and 20 minutes, respectively. Evaluation of deterioration of the thermal insulating layer and evaluation of adhesiveness of the thermal insulating layer and the metal film were carried out by the similar manner as Example 1 with the samples prepared as those used for the evaluation test in Example 1 as shown in FIG. 3. The results are shown in Table 1. As apparent from the results in Table 1, the water-blocking layer effectively functions with the configuration of Example 8.

Example 9

[Thermal Insulated Mold Having a Thermal Insulating Layer Formed of a Zirconia Sintered Body]

In the same manner as Example 3, the first water-blocking layer 15 and the second water-blocking layer 16 prepared were respectively a molybdenum film of 0.2 μm thickness and a copper film of 8 μm thickness. The stacked films forming the water-blocking layer were formed by replacing the titanium target in the sputtering device with a molybdenum target having the same size. The films were prepared under the same film formation conditions as Example 3 except that the period of film formation of the molybdenum film and the copper film was 1 minute and 15 seconds and 20 minutes, respectively. Evaluation of deterioration of the thermal insulating layer and evaluation of adhesiveness of the thermal insulating layer and the metal film were carried out by the similar manner as Example 1 with the samples prepared as those used for the evaluation test in Example 1 as shown in FIG. 3. The results of Table 1 are shown in Table 1. As apparent from the results in Table 1, the water-blocking layer effectively functions with the configuration of Example 9.

Example 10

[Thermal Insulated Mold Having a Thermal Insulating Layer Formed of a Zirconia Sintered Body]

In the same manner as Example 3, the first water-blocking layer 15 and the second water-blocking layer 16 prepared were respectively a tungsten film of 0.2 μm thickness and a copper film of 8 μm thickness. The stacked films forming the water-blocking layer were formed by replacing the titanium target in the sputtering device with a tungsten target having the same size. The stacked films forming the water-blocking layer were prepared under the same film formation conditions as Example 3 except that the period of film formation of the tungsten film and the copper film was 1 minute and 45 seconds and 20 minutes, respectively. Evaluation of deterioration of the thermal insulating layer and evaluation of adhesiveness of the thermal insulating layer and the metal film were carried out by the similar manner as Example 1 with the samples prepared as those used for the evaluation test in Example 1 as shown in FIG. 3. The results are shown in Table 1. As apparent from the results in Table 1, the water-blocking layer effectively functions with the configuration of Example 10.

Example 11

[Thermal Insulated Mold Having a Thermal Insulating Layer Formed of a Zirconia Sintered Body]

In the same manner as Example 3, the first water-blocking layer 15 and the second water-blocking layer 16 prepared were respectively an iron film of 0.2 μm thickness and a copper film of 8 μm thickness. The films were prepared under the same film formation conditions as Example 3 except that the period of film formation of the iron film and the copper film was 1 minute and 3 seconds and 20 minutes, respectively. Evaluation of deterioration of the thermal insulating layer and evaluation of adhesive properties of the thermal insulating layer and the metal film were carried out by the same manner as Example 1 with the samples prepared as those used for the evaluation test in Example 1 as shown in FIG. 3. The results are shown in Table 1. As apparent from the results in Table 1, the water-blocking layer effectively functions with the configuration of Example 11.

Example 12

[Thermal Insulated Mold Having a Thermal Insulating Layer Formed of a Zirconia Sintered Body]

In the same manner as Example 3, the first water-blocking layer 15 and the second water-blocking layer 16 prepared were respectively a titanium film of 0.02 μm thickness and an iron film of 7 μm thickness. The stacked films forming the water-blocking layer were formed by replacing the copper target in the sputtering device with an iron target having the same size. The films were prepared under the same film formation conditions as Example 3 except that the period of film formation of the titanium film and the iron film was 12 seconds and 36 minutes, respectively. Evaluation of deterioration of the thermal insulating layer and evaluation of adhesiveness of the thermal insulating layer and the metal film were carried out by the similar manner as Example 1 with the samples prepared as those used for the evaluation test in Example 1 as shown in FIG. 3. The results are shown in Table 1. As apparent from the results in Table 1, the water-blocking layer effectively functions with the configuration of Example 12.

Example 13

[Thermal Insulated Mold Having a Thermal Insulating Layer Formed of a Zirconia Sintered Body]

From the formation of the stacked films in the water-blocking layers of Examples 11 and 12, it is apparent that the iron films obtained by sputtering have properties for both the first water-blocking layer and the second water-blocking layer. Thus a single layer of an iron film was used as the water-blocking layer 17 and examined. The water-blocking layer formed of the iron single layer of 15 μm thickness was formed with the sputtering device used in Example 1 except that an iron thin plate was used as one target and sputtering was carried out for 77 minutes at a degree of vacuum of 0.6 Pa and input power for sputtering of 2 kW. After the hydrothermal treatment at 250° C. for 30 minutes, the surface of the iron film was modified more significantly than the copper film to give an iron oxide film. However the insulating substrate formed of the zirconia sintered body did not show any change in the crystal phase as Example 1. Evaluation of deterioration of the thermal insulating layer and evaluation of adhesiveness of the thermal insulating layer and the metal film were carried out by the similar manner as Example 1 with the samples prepared as those used for the evaluation test in Example 1 as shown in FIG. 3. The results are shown in Table 1. As apparent from the results in Table 1, the water-blocking layer effectively functions with the configuration of Example 13.

Example 14

[Thermal Insulated Mold Having a Thermal Insulating Layer Formed of a Zirconia Sprayed Film]

Figure 6:
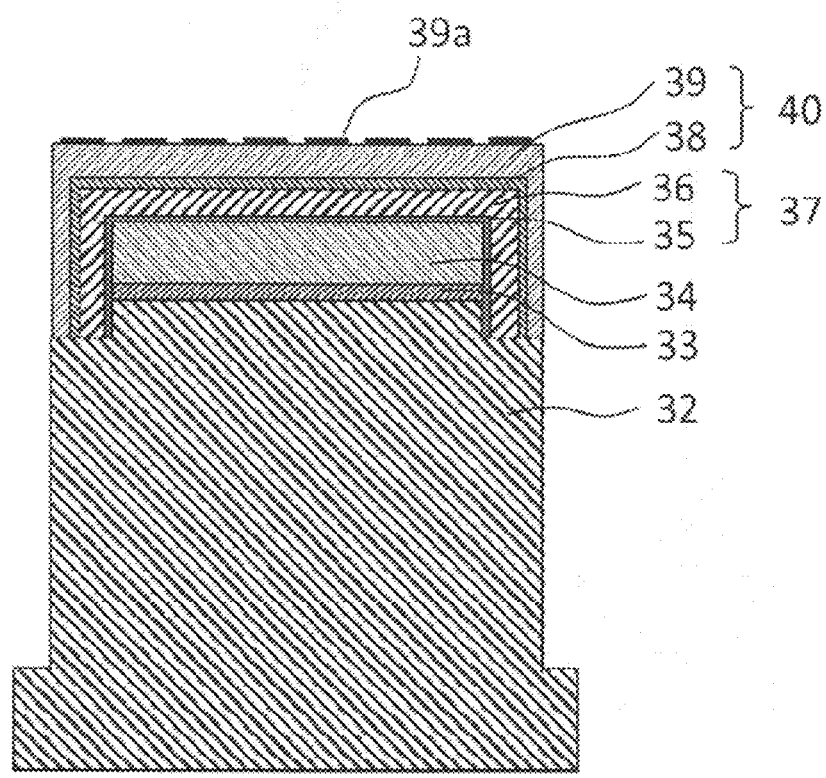
FIG. 6 is a schematic section view of the thermal insulated mold of Example 14 of the present invention.

FIG. 6 shows a section view of the configuration of an thermal insulated mold 31 of the present invention having an thermal insulating layer formed of a zirconia thermal-sprayed film of Example 14. The thermal insulated mold 31 is, as the thermal insulated mold of Example 1 of the present invention described above, a mold used for molding of resin components having precision microfabricated configurations and has a shape such that two cylinders are stacked with the same central axis. Namely, the structure includes a cylinder with low height of 7.5 mm (diameter: 40.0 mm) and a cylinder with a height of 32.6 mm (diameter: 35.0 mm) stacked thereon.

The material for a mold base material 32 formed of metal was stainless steel having high hardness. The mold base material 32 formed of metal has a shape of a cylinder having a height from the bottom of 40.0 mm including a cylinder with low height of 7.5 mm and the shape of the molding surface thereof is a cylinder with a diameter of 35.0 mm (height 32.5 mm). The mold base material 32 formed of metal also has a protruded shape by machining so as to have a step with a width of 0.3 mm except for the outer circumference of a cylinder having a diameter of 34.8 mm and having the same central axis.

A bonding layer 33 (thickness: 50 μm) formed of a sprayed film of a nickel-chromium-aluminium-yttrium alloy is arranged on the surface of the protruded part on the side of the molding surface having a diameter of 34.8 mm of the mold base material 32 formed of metal and an thermal insulating layer 34 having a smooth surface formed of a zirconia sprayed film (composition: $ZrO_2/Y_2O_3/HfO_2$=94.6/4.8/0.6 (mol % ratio) and thickness: 200 μm) is arranged on the bonding layer 33, and a water-blocking layer 37 is further formed so as to cover the upper and side surfaces of the thermal insulating layer 34. The water-blocking layer 37 has the same structure as the water-blocking layer 7 in Example 1 of the present invention and includes a first water-blocking layer 35 (thickness: 0.2 μm) formed of a

TABLE 1

| | Water-blocking layer | | | | Change in crystal phase of thermal insulating layer after hydrothermal treatment at 250° C., for 30 min (by X-ray diffractometry) | Adhesiveness test results Test load | | |
|---|---|---|---|---|---|---|---|---|
| | First water-blocking layer | | Second water-blocking layer | | | | | |
| | Material | Film thickness (μm) | Material | Film thickness (μm) | | 5 kg | 10 kg | 15 kg |
| Ex. 1 | Ti | 0.2 | Cu | 1 | No | ◯ | ◯ | ◯ |
| Ex. 2 | Ti | 0.1 | Cu | 10 | No | ◯ | ◯ | ◯ |
| Ex. 3 | Ti | 0.02 | Cu | 4 | No | ◯ | ◯ | ◯ |
| Ex. 4 | Ti | 0.2 | Cu | 20 | No | ◯ | ◯ | ◯ |
| Ex. 5 | Ti | 0.8 | Cu | 8 | No | ◯ | ◯ | ◯ |
| Ex. 6 | Ta | 0.05 | Cu | 8 | No | ◯ | ◯ | ◯ |
| Ex. 7 | Ta | 0.2 | Cu | 8 | No | ◯ | ◯ | ◯ |
| Ex. 8 | Cr | 0.2 | Cu | 8 | No | ◯ | ◯ | ◯ |
| Ex. 9 | Mo | 0.2 | Cu | 8 | No | ◯ | ◯ | ◯ |
| Ex. 10 | W | 0.2 | Cu | 8 | No | ◯ | ◯ | ◯ |
| Ex. 11 | Fe | 0.2 | Cu | 8 | No | ◯ | ◯ | ◯ |
| Ex. 12 | Ti | 0.02 | Fe | 7 | No | ◯ | ◯ | ◯ |
| Ex. 13 | Material Fe | Film thickness (μm) 15 | | | No | ◯ | ◯ | ◯ |
| Comp. sample 11b | | | — | | Yes | ◯ | ◯ | ◯ | titanium film and a second water-blocking layer 36 (thickness: 10 µm) formed of a copper film. A metal film 40 is formed on the second water-blocking layer 36. The metal film 40 includes a first metal film 38 (thickness: 2 µm) formed of a nickel plated film similar to the metal film 10 in Example 1 of the present invention and a second metal film 39 (maximum thickness: 100 µm) formed of an amorphous nickel-phosphorous alloy plated film. The second metal film 39 has a molding surface that is a precision processed surface 39a with fine patterns for resin molding having a maximum depth of 28 µm formed by precision machining.

According to the above configuration, the zirconia sprayed film which is an insulating film having low thermal conductivity does not contact water during the plating step for formation of the metal film in the production process of the thermal insulated mold, and thus deterioration of the zirconia sprayed film having this configuration at low temperatures for molding of resins can be prevented. As a result, the thermal insulated mold allows molding of resins having preferable fine patterns for a prolonged period of time.

Figure 7:
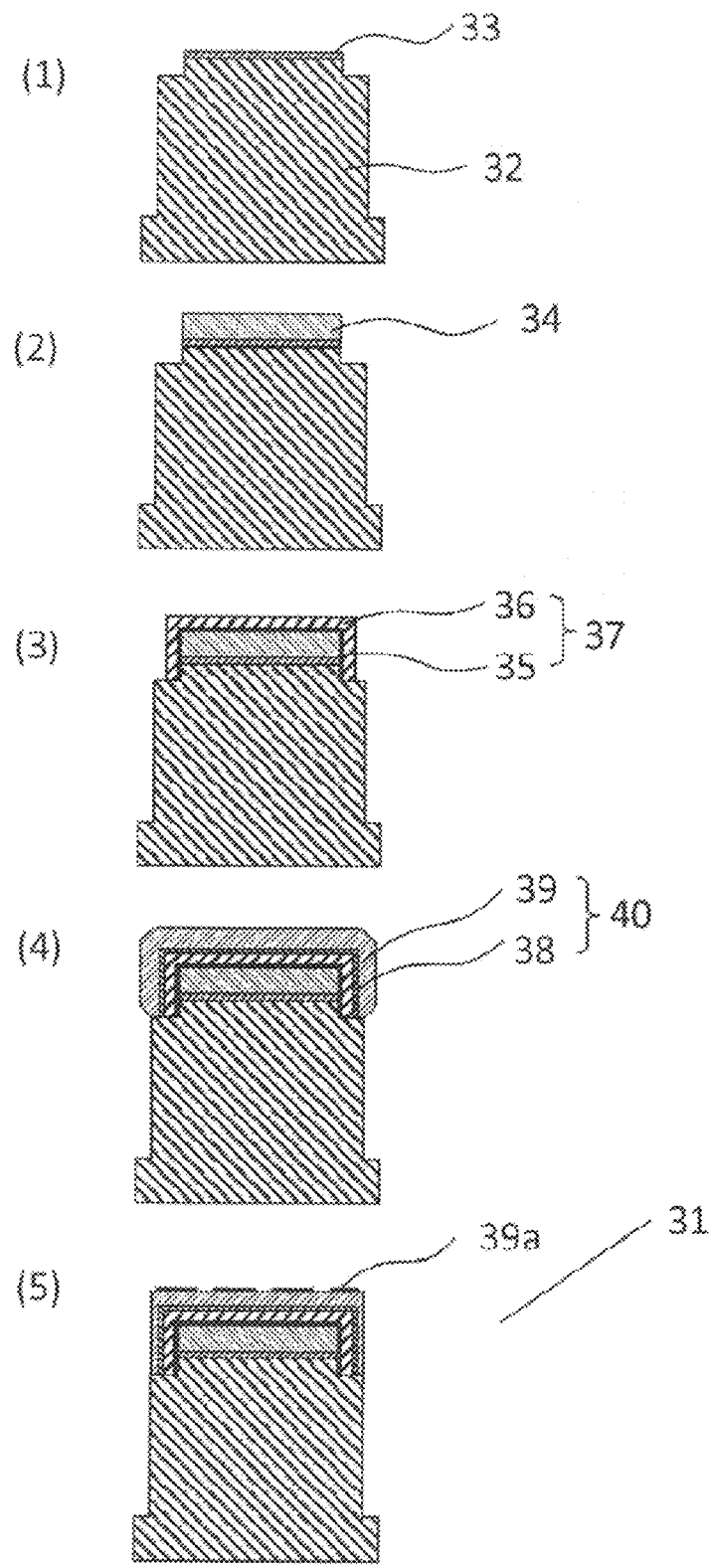
FIG. 7 is a view illustrating preparation steps of the thermal insulated mold of Example 14 of the present invention.

FIG. 7 shows production steps of the thermal insulated mold 31 of the present invention. On the mold base material 32 formed of a stainless steel having the dimensions described above, the bonding layer 33 having a thickness of 50 µm which was formed of a sprayed film of a nickel-chromium-aluminium-yttrium alloy was formed by air plasma spraying (FIG. 7 (1)). A zirconia film having a thickness of about 300 µm was formed thereon by air plasma spraying. The zirconia sprayed film described above was processed to a thickness of 200 µm by precision grinding so as to expose a smooth surface in order to prepare an thermal insulating layer 34 (FIG. 7 (2)).

A first water-blocking layer 35 (titanium) having a thickness of 0.2 µm was formed with the same sputtering device and the same manner as Example 1 of the present invention by sputtering for 2 minutes at a degree of vacuum of 0.6 Pa and input power of sputtering of 2 kW using the metallic titanium target. A dense second water-blocking layer 36 (copper) having a thickness of 10 µm was further formed with the metallic copper target by sputtering for 25 minutes at the same degree of vacuum and input power for sputtering of 2 kW, thereby obtaining the water-blocking layer 37 having the double layer (FIG. 7 (3)).

A first metal film layer 38 (nickel) having a thickness of 2 µm was then formed by nickel strike plating by the same manner as in Example 1 of the present invention. A second metal film layer 39 (amorphous nickel-phosphorous alloy) having a thickness of 250 µm was further formed by electroless nickel plating. The metal film layer 40 was thus prepared and subjected to heat treatment at 200° C. for 3 hours (FIG. 7 (4)).

The metal film layer 40 was then processed on the side surface thereof by the same manner as Example 1 of the present invention so that the side surface aligned to the side surface of the cylinder of the mold base material 32 formed of metal. The second metal film layer 39 was then subjected to precision grinding to form a precision processed surface 39a, thereby obtaining the thermal insulated mold 31 (FIG. 7 (5)).

Evaluation of Deterioration of Thermal Insulating Layer

Figure 8:
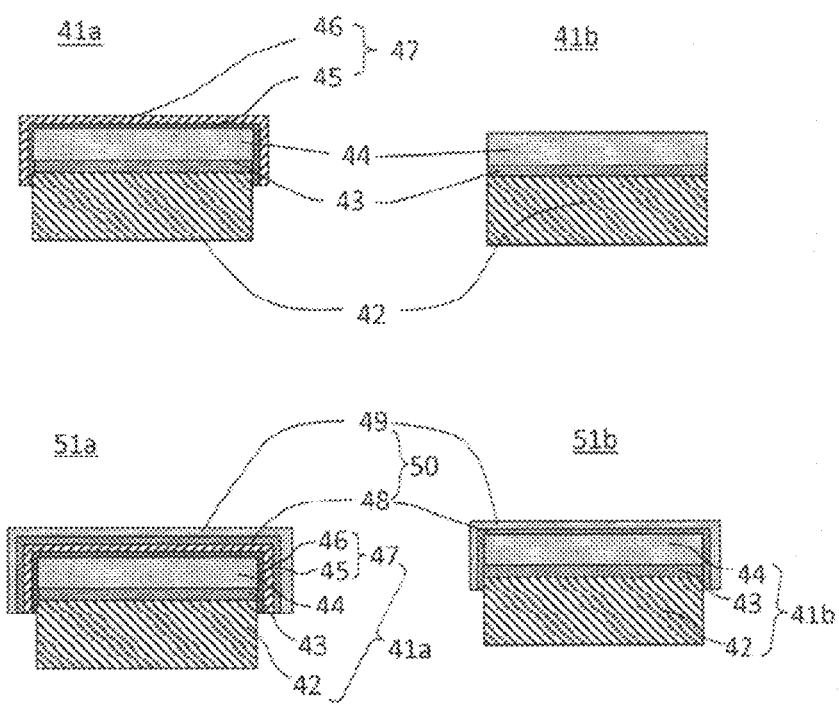
FIG. 8 a schematic section view of an evaluation specimen of the structure of the thermal insulated mold of Example 14 of the present invention and an evaluation specimen of the structure of a conventional thermal insulated mold.

In order to evaluate deterioration of thermal insulating layers, a first sample 41a having the sectional structure of films shown in FIG. 8 was used. Two substrates (30 mm long, 30 mm wide, 6 mm thick) formed of the same metal as the mold base material 32 formed of metal shown in FIG. 6 were prepared. A bonding layer 43 formed of the metal alloy sprayed film and an thermal insulating layer 44 formed of the zirconia sprayed film having the same compositions as the metal alloy sprayed film and the zirconia sprayed film respectively forming the bonding layer 33 and the thermal insulating layer 34 shown in FIG. 6 were respectively formed on the substrates by the same manner and thermal spraying conditions as the metal alloy sprayed film and the zirconia sprayed film respectively forming the bonding layer 33 and the thermal insulating layer 34. A stacked film (water-blocking layer 47) of a titanium film (thickness: 0.2 µm) as the first water-blocking layer 45 and a copper film (thickness: 10 µm) as the second water-blocking layer 46 was formed on the whole surface of one of the two substrates by the same manner as the water-blocking layer 37 in the thermal insulated mold 31 of the present invention in order to obtain a first sample 41a. The other substrate among two substrates served as, without modification, a first comparative sample 41b without formation of a water-shielding layer.

The thermal insulating layer 44 formed of the zirconia sprayed film was evaluated for deterioration thereof under a wet atmosphere with the autoclave similar to the one in Example 1 by the same manner by observing the change thereof over time under the same conditions as Example 1.

Figure 9:
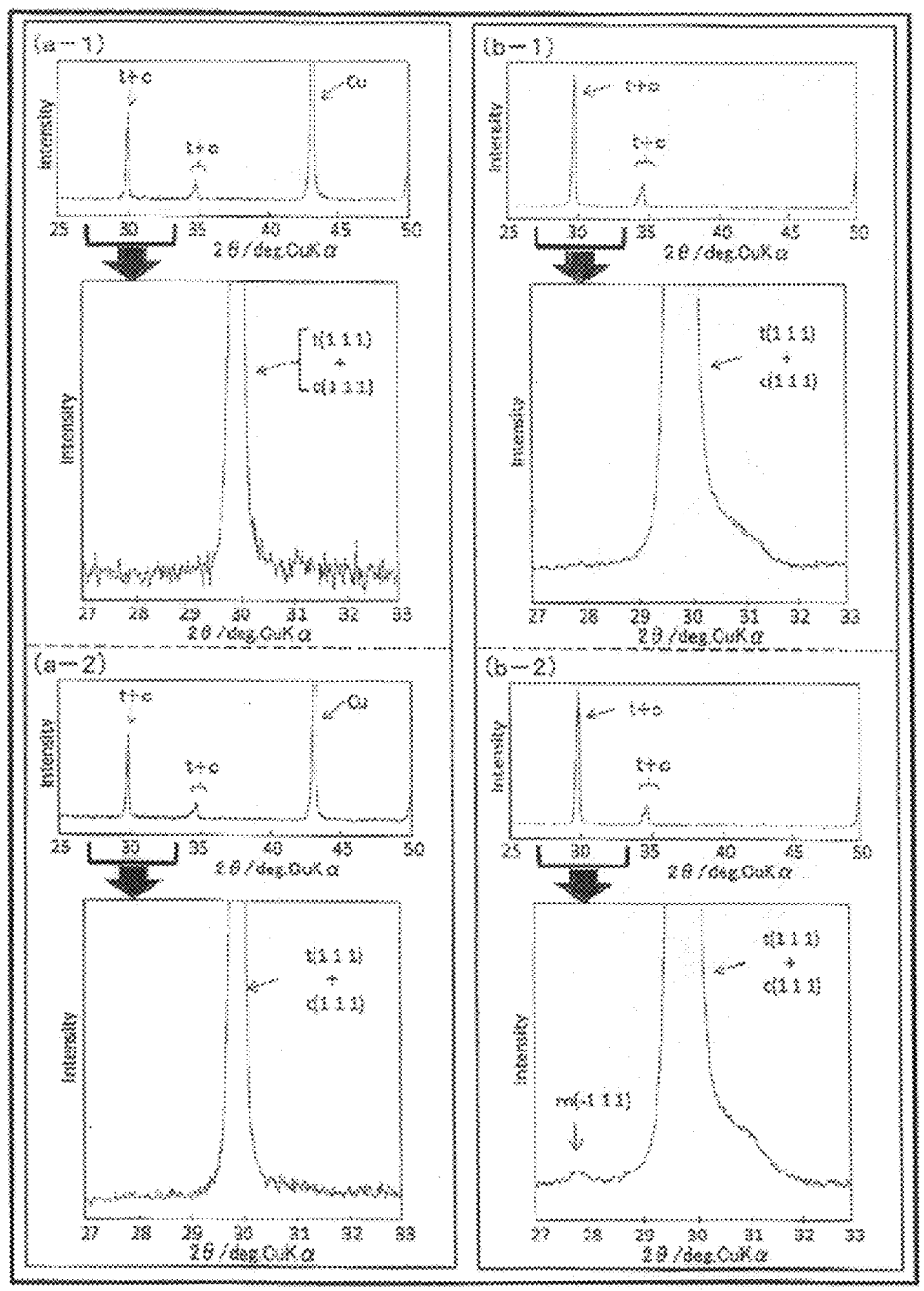
FIG. 9 is a view illustrating X-ray diffraction patterns of the evaluation specimen of the structure of the thermal insulated mold of Example 14 of the present invention and the evaluation specimen of the structure of a conventional mold before and after the deterioration evaluation test.

The panels (a-1) and (a-2) in FIG. 9 show X-ray diffraction patterns of the first sample 41a respectively before and after the hydrothermal treatment at 250° C. for 60 hours. The panels (b-1) and (b-2) in FIG. 9 show X-ray diffraction patterns of the first comparative sample 41b respectively before and after the hydrothermal treatment at 250° C. for 60 hours.

Zirconia sprayed films are obtained by rapid cooling of molten zirconia particles at the surface of substrates during film formation by spraying. During this rapid cooling, the cubic crystal phase which is more stable at high temperatures than the tetragonal crystal phase is formed by supercooling in sprayed films. X-ray diffraction patterns in the panels (a-1) and (b-1) in FIG. 9 demonstrate that the first sample 41a and the first comparative sample 41b contain mixed phases of the cubic crystal phase and the tetragonal crystal phase. In the figure, diffraction peaks attributable to the cubic, tetragonal and monoclinic crystal phases are respectively designated as "c", "t" and "m".

The panel (b-2) in FIG. 9 demonstrates that a slight peak (shown as "m(−1 1 1)") resulting from the monoclinic crystal phase in the internal crystal is generated for the first comparative sample 41b under the hydrothermal atmosphere at 250° C. Namely it is found that a part of the tetragonal crystal phase in the first comparative sample 41b gradually undergoes phase transition to the monoclinic crystal phase. This is the same phase transition as the zirconia sintered body shown in Example 1 and is well known as a phenomenon preceding deterioration under wet and low temperature conditions of zirconia ceramics. It is believed that the surface of the zirconium oxide crystal particles of the internal tetragonal crystal phase forming the zirconia sprayed film is gradually converted to the monoclinic crystal phase by means of water under the hydrothermal environment. It is predicted that this change is accompanied by significant volume expansion, so that the deterioration gradually develops.

On the other hand, as shown in (a-1) in FIG. 9 the first sample 41a with the water-blocking layer 47 having the same structure as the water-blocking layer 37 of the thermal insulated mold of the present invention as shown in FIG. 6 did not show the change in the X-ray diffraction peaks attributable to the zirconia sintered body even after the same hydrothermal treatment for 60 hours (shown as "Ex. 15" in Table 2). As described above, it is demonstrated that the thermal insulated mold 31 of the present invention undergoes decreased deterioration in the strength of the thermal insulating layer 34 formed of the zirconia sprayed film, that means effective suppression of deterioration in the strength due to the water-blocking layer.

Evaluation of Adhesiveness of Thermal Insulating Layer and Metal Film

In Example 14, adhesiveness of the thermal insulating layer 34, the water-blocking layer 37 and the metal film 40 was also examined. The test for adhesiveness was carried out by the same method as Example 1 with the instrument shown in FIG. 5. On a freshly prepared sample having the same shape as and prepared as the first sample 41a used for the evaluation of deterioration of the thermal insulating layer, a metal film 50 formed of stacked films of a first metal film 48 (a nickel plated film having a thickness of 2 μm) and a second metal film 49 (an amorphous nickel-phosphorous plated film having a thickness of 30 μm) was formed by the same manner as the thermal insulated mold 31 of the present invention, thereby preparing a second sample 51a.

Figure 5:
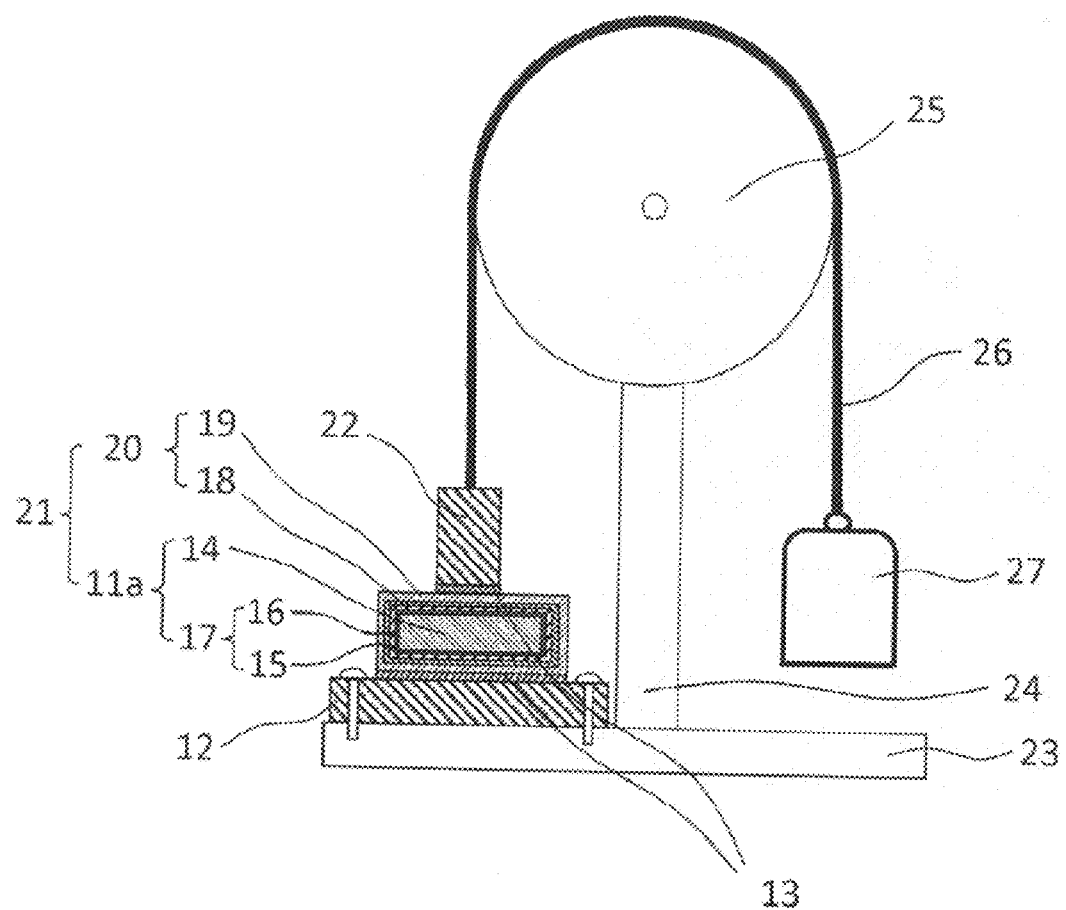
FIG. 5 is a schematic view of an adhesion strength test instrument of the evaluation specimen of the thermal insulated mold of Example 1 of the present invention.

The test for adhesiveness was carried out with the second sample 51a instead of the second sample 21a on the instrument for evaluation of adhesiveness shown in FIG. 5 in Example 1. As a result, the metal film 50 did not show a blister or film lifting on the surface thereof even in the test using the weight 27 of 15 kg. Thus it was demonstrated that there was high adhesiveness between the zirconia sintered body, the water-blocking layer 47 and the metal film layer 50. The results are also shown in Table 2.

As a comparative sample for the evaluation of adhesiveness, a second comparative sample 51b was prepared which was obtained by directly forming, on a freshly prepared comparative sample having the same shape as the first comparative sample 41a shown in FIG. 8 for evaluation of deterioration of the thermal insulating layer, a metal film 50 formed of stacked films of a first metal film 48 (a nickel plated film having a thickness of 2 μm) and a second metal film 49 (an amorphous nickel-phosphorous plated film having a thickness of 30 μm) by the same manner as the thermal insulated mold 31 of the present invention. Adhesiveness was similarly evaluated by using the second comparative sample 51b instead of the second sample 51a. As a result, no blister was generated on the surface of the metal film 50 in the test using the weight 27 of 10 kg; however the metal film 20 was observed to have film lifting on the surface thereof when the weight was 15 kg. Thus the metal film 50 was detached from the thermal insulating layer 44 formed of the zirconia sprayed film.

Example 15

[Thermal Insulated Mold Having a Thermal Insulating Layer Formed of a Zirconia Thermal-Sprayed Film]

A thermal insulated mold was prepared by employing a titanium film of 0.1 μm thickness and a copper film of 10 μm thickness respectively as the first water-blocking layer 35 and the second water-blocking layer 36 forming the water-blocking layer 37 in the thermal insulated mold of the present invention in Example 14. The stacked films forming the water-blocking layer were formed by the same manner as Example 1 except that the period of film formation of the titanium film and the copper film was 1 minute and 25 minutes, respectively. Evaluation of deterioration of the thermal insulating layer and evaluation of adhesiveness of the thermal insulating layer and the metal film were carried out by the similar manner as Example 14 with the samples prepared as those used for the evaluation test in Example 14 as shown in FIG. 8. The results are shown in Table 2. As apparent from the results in Table 2, the water-blocking layer effectively functions with the configuration of Example 15.

Example 16

[Thermal Insulated Mold Having a Thermal Insulating Layer Formed of a Zirconia Sprayed Film]

Samples Similar to the First and Second Samples as Shown in FIG. 8 in Example 14 were prepared and subjected to evaluation of deterioration of the thermal insulating layer and evaluation of adhesiveness of the thermal insulating layer and the metal film similar to Example 1. The first water-blocking layer 35 and the second water-blocking layer 36 were respectively a titanium film of 0.02 μm thickness and a copper film of 8 μm thickness. The stacked films forming the water-blocking layer were formed by the same manner as Example 14 except that the period of film formation of the titanium film and the copper film was 12 seconds and 20 minutes, respectively. Evaluation of deterioration of the thermal insulating layer and evaluation of adhesiveness of the thermal insulating layer and the metal film were carried out by the similar manner as Example 14 with the samples prepared as those used for the evaluation test in Example 14 as shown in FIG. 8. The results are shown in Table 2. As apparent from the results in Table 2, the water-blocking layer effectively functions with the configuration of Example 16.

Example 17

[Thermal Insulated Mold Having a Thermal Insulating Layer Formed of a Zirconia Sprayed Film]

In the same manner as Example 16, the first water-blocking layer 35 and the second water-blocking layer 36 prepared were respectively a titanium film of 0.2 μm thickness and a copper film of 20 μm thickness. The stacked films were formed under the same film formation conditions as Example 16 except that the period of film formation of the titanium film and the copper film was 2 minutes and 50 minutes, respectively. Evaluation of deterioration of the thermal insulating layer and evaluation of adhesiveness of the thermal insulating layer and the metal film were carried out by the similar manner as Example 14 with the samples prepared as those used for the evaluation test in Example 14 as shown in FIG. 8. The results are shown in Table 2. As apparent from the results in Table 2, the water-blocking layer effectively functions with the configuration of Example 17.

Example 18

[Thermal Insulated Mold Having a Thermal Insulating Layer Formed of a Zirconia Sprayed Film]

In the same manner as Example 16, the first water-blocking layer 35 and the second water-blocking layer 36 prepared were respectively a titanium film of 0.4 μm thickness and a copper film of 8 μm thickness. The stacked films forming the water-blocking layer were formed under the same film formation conditions as Example 16 except that the period of film formation of the titanium film and the copper film was 4 minutes and 20 minutes, respectively. Evaluation of deterioration of the thermal insulating layer and evaluation of adhesiveness of the thermal insulating layer and the metal film were carried out by the similar manner as Example 14 with the samples prepared as those used for the evaluation test in Example 14 as shown in FIG.

8. The results are shown in Table 2. As apparent from the results in Table 2, the water-blocking layer effectively functions with the configuration of Example 18.

Example 19

[Thermal Insulated Mold Having a Thermal Insulating Layer Formed of a Zirconia Sprayed Film]

In the same manner as Example 16, the first water-blocking layer 35 and the second water-blocking layer 36 prepared were respectively a tantalum film of 0.05 μm thickness and a copper film of 10 μm thickness. The stacked films forming the water-blocking layer were formed by replacing the titanium target in the sputtering device with a tantalum target having the same size. The films were prepared under the same film formation conditions as Example 16 except that the period of film formation of the tantalum film and the copper film was 26 seconds and 25 minutes, respectively. Evaluation of deterioration of the thermal insulating layer and evaluation of adhesiveness of the thermal insulating layer and the metal film were carried out by the similar manner as Example 14 with the samples prepared as those used for the evaluation test in Example 14 as shown in FIG. 8. The results are shown in Table 2. As apparent from the results in Table 2, the water-blocking layer effectively functions with the configuration of Example 19.

Example 20

[Thermal Insulated Mold Having a Thermal Insulating Layer Formed of a Zirconia Sprayed Film]

In the same manner as Example 19, the first water-blocking layer 35 and the second water-blocking layer 36 prepared were respectively a tantalum film of 0.2 μm thickness and a copper film of 10 μm thickness. The stacked films forming the water-blocking layer were formed under the same film formation conditions as Example 19 except that the period of film formation of the tantalum film and the copper film was 1 minute and 45 seconds and 25 minutes, respectively. Evaluation of deterioration of the thermal insulating layer and evaluation of adhesiveness of the thermal insulating layer and the metal film were carried out by the similar manner as Example 14 with the samples prepared as those used for the evaluation test in Example 14 as shown in FIG. 8. The results are shown in Table 2. It is apparent from the results in Table 2 that the water-blocking layer effectively functions with the configuration of Example 20.

Example 21

[Thermal Insulated Mold Having a Thermal Insulating Layer Formed of a Zirconia Sprayed Film]

In the same manner as Example 16, the first water-blocking layer 35 and the second water-blocking layer 36 prepared were respectively a chromium film of 0.2 μm thickness and a copper film of 10 μm thickness. The stacked films forming the water-blocking layer were formed by replacing the titanium target in the sputtering device with a chromium target having the same size. The films were prepared under the same film formation conditions as Example 16 except that the period of film formation of the chromium film and the copper film was 50 seconds and 25 minutes, respectively. Evaluation of deterioration of the thermal insulating layer and evaluation of adhesiveness of the thermal insulating layer and the metal film were carried out by the similar manner as Example 14 with the samples prepared as those used for the evaluation test in Example 14 as shown in FIG. 8. The results are shown in Table 2. As apparent from the results in Table 2, the water-blocking layer effectively functions with the configuration of Example 21.

Example 22

[Thermal Insulated Mold Having a Thermal Insulating Layer Formed of a Zirconia Sprayed Film]

In the same manner as Example 16, the first water-blocking layer 35 and the second water-blocking layer 36 prepared were respectively a molybdenum film of 0.2 μm thickness and a copper film of 10 μm thickness. The stacked films forming the water-blocking layer were formed by replacing the titanium target in the sputtering device with a molybdenum target having the same size. The films were prepared under the same film formation conditions as Example 16 except that the period of film formation of the molybdenum film and the copper film was 1 minute and 15 seconds and 25 minutes, respectively. Evaluation of deterioration of the thermal insulating layer and evaluation of adhesiveness of the thermal insulating layer and the metal film were carried out by the similar manner as Example 14 with the samples prepared as those used for the evaluation test in Example 14 as shown in FIG. 8. The results are shown in Table 2. As apparent from the results in Table 2, the water-blocking layer effectively functions with the configuration of Example 22.

Example 23

[Thermal Insulated Mold Having a Thermal Insulating Layer Formed of a Zirconia Sprayed Film]

In the same manner as Example 16, the first water-blocking layer 35 and the second water-blocking layer 36 prepared were respectively a tungsten film of 0.2 μm thickness and a copper film of 10 μm thickness. The stacked films forming the water-blocking layer were formed by replacing the titanium target in the sputtering device with a tungsten target having the same size. The films were prepared under the same film formation conditions as Example 16 except that the period of film formation of the tungsten film and the copper film was 1 minute and 45 seconds and 25 minutes, respectively. Evaluation of deterioration of the thermal insulating layer and evaluation of adhesiveness of the thermal insulating layer and the metal film were carried out by the similar manner as Example 14 with the samples prepared as those used for the evaluation test in Example 14 as shown in FIG. 8. The results are shown in Table 2. It is apparent from the results in Table 2 that the water-blocking layer effectively functions with the configuration of Example 23.

Example 24

[Thermal Insulated Mold Having a Thermal Insulating Layer Formed of a Zirconia Sprayed Film]

In the same manner as Example 16, the first water-blocking layer 35 and the second water-blocking layer 36 prepared were respectively an iron film of 0.2 μm thickness and a copper film of 10 μm thickness. The stacked films forming the water-blocking layer were prepared under the same film formation conditions as Example 3 except that the period of film formation of the iron film and the copper film was 1 minute and 3 seconds and 25 minutes, respectively. Evaluation of deterioration of the thermal insulating layer and evaluation of adhesiveness of the thermal insulating layer and the metal film were carried out by the similar manner as Example 14 with the samples prepared as those used for the evaluation test in Example 14 as shown in FIG. 8. The results are shown in Table 2. As apparent from the results in Table 2, the water-blocking layer effectively functions with the configuration of Example 24.

Example 25

[Thermal Insulated Mold Having a Thermal Insulating Layer Formed of a Zirconia Sprayed Film]

In the same manner as Example 16, the first water-blocking layer 35 and the second water-blocking layer 36 prepared were respectively a titanium film of 0.02 μm thickness and an iron film of 15 μm thickness. The stacked films forming the water-blocking layer were formed by replacing the copper target in the sputtering device with an iron target having the same size. The films were prepared under the same film formation conditions as Example 16 except that the period of film formation of the titanium film and the iron film was 12 seconds and 77 minutes, respectively. Evaluation of deterioration of the thermal insulating layer and evaluation of adhesiveness of the thermal insulating layer and the metal film were carried out by the similar manner as Example 14 with the samples prepared as those used for the evaluation test in Example 14 as shown in FIG. 8. The results are shown in Table 2. As apparent from the results in Table 2, the water-blocking layer effectively functions with the configuration of Example 25.

Example 26

[Thermal Insulated Mold Having a Thermal Insulating Layer Formed of a Zirconia Sprayed Film]

The water-blocking layer formed of the iron single layer of 20 μm thickness was formed with the sputtering device used in Example 16 except that an iron thin plate was used as one target and sputtering was carried out for 100 minutes at a degree of vacuum of 0.6 Pa and input power for sputtering of 2 kW. After the hydrothermal treatment at 250° C. for 30 minutes, the surface of the iron film was modified more significantly than the copper film to give an iron oxide film. However, the insulating substrate formed of the zirconia thermal-sprayed film did not show any change in the crystal phase as Example 14. Evaluation of deterioration of the thermal insulating layer and evaluation of adhesiveness of the thermal insulating layer and the metal film were carried out by the similar manner as Example 14 with the samples prepared as those used for the evaluation test in Example 14 as shown in FIG. 8. The results are shown in Table 2. As apparent from the results in Table 2, the water-blocking layer effectively functions with the configuration of Example 26.

TABLE 2

| | First water-blocking layer | | Second water-blocking layer | | Change in crystal phase of thermal insulating layer after hydrothermal treatment at 250° C., for 60 hrs (by X-ray diffractometry) | Adhesiveness test results Test load | | |
|---|---|---|---|---|---|---|---|---|
| | Material | Film thickness (μm) | Material | Film thickness (μm) | | 5 kg | 10 kg | 15 kg |
| Ex. 14 | Ti | 0.2 | Cu | 10 | No | ○ | ○ | ○ |
| Ex. 15 | Ti | 0.1 | Cu | 10 | No | ○ | ○ | ○ |
| Ex. 16 | Ti | 0.02 | Cu | 8 | No | ○ | ○ | ○ |
| Ex. 17 | Ti | 0.2 | Cu | 20 | No | ○ | ○ | ○ |
| Ex. 18 | Ti | 0.4 | Cu | 8 | No | ○ | ○ | ○ |
| Ex. 19 | Ta | 0.05 | Cu | 10 | No | ○ | ○ | ○ |
| Ex. 20 | Ta | 0.2 | Cu | 10 | No | ○ | ○ | ○ |
| Ex. 21 | Cr | 0.2 | Cu | 10 | No | ○ | ○ | ○ |
| Ex. 22 | Mo | 0.2 | Cu | 10 | No | ○ | ○ | ○ |
| Ex. 23 | W | 0.2 | Cu | 10 | No | ○ | ○ | ○ |
| Ex. 24 | Fe | 0.2 | Cu | 10 | No | ○ | ○ | ○ |
| Ex. 25 | Ti | 0.02 | Fe | 15 | No | ○ | ○ | ○ |
| Ex. 26 | Material Fe | | Film thickness (μm) 20 | | No | ○ | ○ | ○ |
| Comp. sample 41b | — | | | | Yes | ○ | ○ | X |

The present thermal insulated mold which includes the thermal insulating layer formed of zirconia ceramics and has effectively suppressed deterioration in the strength over time has the combined original properties of zirconia of excellent heat insulating properties and high mechanical strength as well as excellent durability in terms of the strength of the mold on the molding surface against repetitive resin molding over a prolonged time. Thus the present thermal insulated mold is useful as a thermal insulated mold having long life for molding of resin articles having complex configurations such as optical elements and articles having fine patterns. The present thermal insulated mold can also be used as a mold for nanoimprint.

What is claimed is:

1. A thermal insulated mold having a thermal insulating layer between a metal mold base material and a metal plated film having a surface for molding, wherein:
 (1) the thermal insulating layer comprises zirconia;
 (2) a water-blocking layer is provided between the thermal insulating layer and the metal plated film;
 (3) the water-blocking layer comprises a plurality of layers respectively having different compositions; and
 (4) the water-blocking layer comprises a first water-blocking layer formed on the thermal insulating layer so as to be in contact with the thermal insulating layer and a second water-blocking layer formed on the first water-blocking layer so as to be in contact with the first water-blocking layer.

2. The thermal insulated mold according to claim 1, wherein the water-blocking layer is formed of a metal or an alloy.

3. The thermal insulated mold according to claim 2, wherein the water-blocking layer is formed of at least one selected from copper, iron, titanium, tantalum, chromium, molybdenum and tungsten and alloys containing thereof.

4. The thermal insulated mold according to claim 1, wherein the first water-blocking layer is formed of at least one selected from titanium, tantalum, chromium, molybdenum, tungsten and iron and alloys containing thereof.

5. The thermal insulated mold according to claim 1, wherein the second water-blocking layer is formed of at least one selected from copper, iron and alloys containing thereof.

6. The thermal insulated mold according to claim 1, wherein the first water-blocking layer has a thickness of 0.02 to 0.8 µm.

7. The thermal insulated mold according to claim 1, wherein the second water-blocking layer has a thickness of 1 to 20 µm.

8. The thermal insulated mold according to claim 1, wherein the water-blocking layer is formed by physical vapour deposition.

9. The thermal insulated mold according to claim 1, wherein the water-blocking layer is formed so as to surround an upper surface and a side surface of the thermal insulating layer.

10. The thermal insulated mold according to claim 1, wherein the thermal insulating layer is formed of a zirconia sintered body.

11. The thermal insulated mold according to claim 1, wherein the thermal insulating layer is formed by thermal spraying.

12. The thermal insulated mold according to claim 1, which is used for molding of a composition comprising a resin component.

13. A method for producing the thermal insulated mold according to claim 1, comprising the steps of:

(1) forming an thermal insulating layer comprising zirconia on a surface on a molding surface side of a metal mold base material;

(2) forming a water-blocking layer on a surface of the insulating layer by physical vapour deposition;

(3) forming a metal plated film on a surface of the water-blocking layer by plating; wherein the step (3) comprises the step of:

(3-1) forming a nickel film by nickel strike plating and (3-2) forming an amorphous nickel-phosphorous alloy film by electroless nickel plating, and (4) implementing machining on a surface of the metal plated film to form a transfer pattern for resin molding.

14. The method according to claim 13, wherein the step (1) comprises the steps of:

(1-1) arranging a bonding layer on the surface on the molding surface side of the metal mold base material;

(1-2) arranging a zirconia sintered body on the bonding layer; and (1-3) applying pressure on the zirconia sintered body while heating to form a thermal insulating layer via the bonding layer.

15. The method according to claim 13, wherein the step (1) comprises the steps of:

(1-1) forming a bonding layer on the surface on the molding surface side of the metal mold base material by thermal spraying; and (1-2) forming the thermal insulating layer comprising zirconia on the bonding layer by thermal spraying.

16. The thermal insulated mold according to claim 1, wherein the metal plated film comprises (a) a nickel film formed on the water-blocking layer and (b) an amorphous nickel-phosphorous alloy film formed on the nickel film.

17. The method according to claim 13, wherein the plating is a wet process using a plating solution containing water.

* * * * *